(12) United States Patent
Takamine et al.

(10) Patent No.: US 6,195,321 B1
(45) Date of Patent: *Feb. 27, 2001

(54) DISK ROTATION CONTROL APPARATUS WITH DECELERATION MEANS

(75) Inventors: Kouichi Takamine, Kawanishisi; Shin-Ichi Yamada, Katanosi; Yasuaki Edahiro, Habikinoshi; Mitsurou Moriya, Ikomasi, all of (JP)

(73) Assignee: Matsushita Electric Industrial Company, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/740,273

(22) Filed: Oct. 25, 1996

(30) Foreign Application Priority Data

Oct. 26, 1995 (JP) .................................................. 7-278790
Jan. 16, 1996 (JP) .................................................. 8-004565

(51) Int. Cl.$^7$ .................................................. G11B 7/00
(52) U.S. Cl. .................................................. 369/50
(58) Field of Search .................................. 369/32, 44.29, 369/44.27, 44.28, 50, 124

(56) References Cited

U.S. PATENT DOCUMENTS

| | | | |
|---|---|---|---|
| 4,796,249 | * 1/1989 | Baas | 369/50 |
| 4,864,553 | * 9/1989 | Sakakibbara et al. | 369/50 |
| 4,864,554 | * 9/1989 | Hamer et al. | 369/50 |
| 5,216,647 | * 6/1993 | Kitani | 369/50 |
| 5,225,755 | 7/1993 | Okamoto | 318/685 |
| 5,227,709 | 7/1993 | Gauthier et al. | 318/685 |
| 5,270,992 | * 12/1993 | Yasuda et al. | 369/50 |
| 5,289,448 | * 2/1994 | Sato | 369/50 |
| 5,412,519 | 5/1995 | Buettner et al. | 360/73.03 |
| 5,444,687 | * 8/1995 | Okumura | 369/50 |
| 5,457,674 | * 10/1995 | Watanabe et al. | 369/50 |
| 5,477,522 | * 12/1995 | Kim | 369/50 |
| 5,502,698 | * 3/1996 | Mochizuki | 369/50 |
| 5,508,987 | * 4/1996 | Matsunaga et al. | 369/50 |
| 5,521,895 | 5/1996 | Miura et al. | 369/50 |
| 5,627,811 | * 5/1997 | Morita et al. | 369/50 |
| 5,636,192 | * 6/1997 | Shimizume et al. | 369/50 |
| 5,642,342 | * 6/1997 | Murata | 369/50 |
| 5,644,561 | * 7/1997 | Son et al. | 369/50 |
| 5,694,380 | * 12/1997 | Shimizume et al. | 369/50 |

FOREIGN PATENT DOCUMENTS 5-109182 4/1993 (JP) .
7-21678 1/1995 (JP) .

* cited by examiner

*Primary Examiner*—Nabil Hindi
(74) *Attorney, Agent, or Firm*—Parkhurst & Wendel, L.L.P.

(57) ABSTRACT

A disk rotation control apparatus includes a spindle motor for rotating a disk, a rotational speed detecting device for detecting the rotational speed of the spindle motor, a signal generating device for generating an acceleration signal that accelerates the rotation of the spindle motor and a deceleration signal that decelerates the rotation of the spindle motor. A storage device for rotating the spindle motor with an acceleration signal generated by the signal generating device, measures a rise time required to reach a prescribed rotational speed ω1 while detecting the rotational speed of the spindle motor by the rotational speed detecting device, and stores the measured rise time. A control device for decides a time to generate the deceleration signal in the signal generating device on the basis of the rise time stored in the storage device, and stops the rotation of the spindle motor by applying the deceleration signal to the spindle motor. Therefore, even when the diameter or the mass of the disk varies or the characteristics of the spindle motor or the driving circuit vary, undesired reverse rotation of the disk due to over-deceleration or undesired increase in the time required to stop the disk is avoided. As a result, the rotation of the disk can be stopped with high reliability.

2 Claims, 25 Drawing Sheets

Fig. 22 (a) PRIOR ART
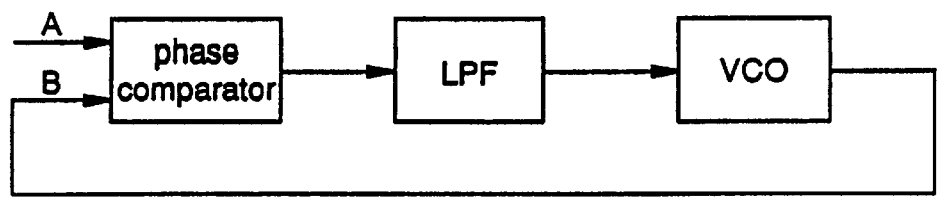
Fig. 22 (b) PRIOR ART
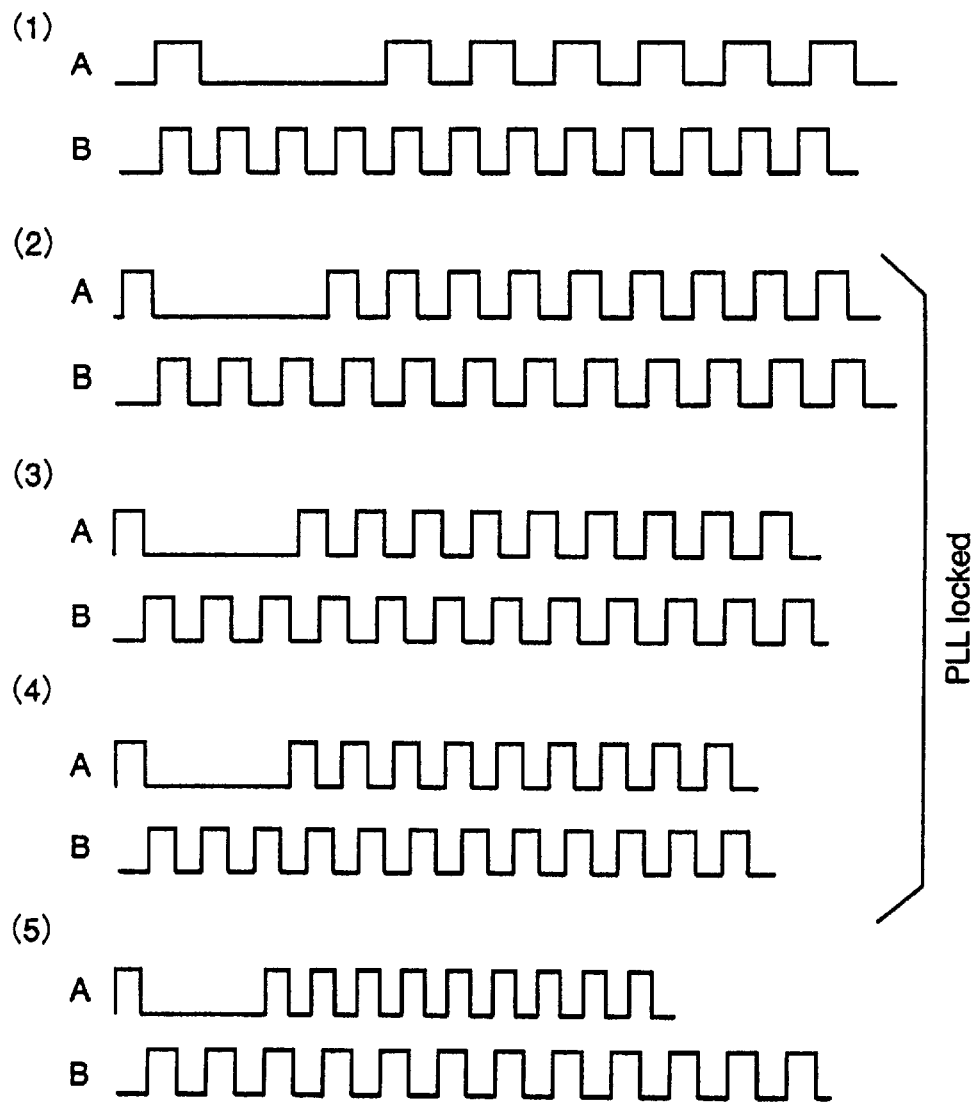

Fig. 25

| | 12cm disk | | | | 8cm disk | | |
|---|---|---|---|---|---|---|---|
| times | Hex. | Dec. | Tr (ms) | times | Hex. | Dec. | Tr (ms) |
| 1 | 36C4h | 14020 | 168.24 | 1 | 10D8h | 4312 | 51.774 |
| 2 | 362Ch | 13868 | 166.416 | 2 | 0F04h | 3844 | 46.128 |
| 3 | 36F8h | 14072 | 168.864 | 3 | 0EC4h | 3780 | 45.36 |
| 4 | 3401h | 13313 | 159.756 | 4 | 0ECEh | 3790 | 45.48 |
| 5 | 3454h | 13396 | 160.752 | 5 | 0E13h | 3603 | 43.236 |
| 6 | 3472h | 13426 | 161.112 | 6 | 1070h | 4208 | 50.496 |
| 7 | 36E4h | 14052 | 168.624 | 7 | 0F37h | 3895 | 46.74 |
| 8 | 3461h | 13409 | 160.908 | 8 | 0F29h | 3881 | 46.572 |
| 9 | 346Ah | 13418 | 161.016 | 9 | 10D0h | 4304 | 51.648 |
| 10 | 3493h | 13459 | 161.508 | 10 | 0E83h | 3715 | 44.58 |
| average | | 13643.3 | 163.7196 | average | | 3933.2 | 47.2014 |
| max-min | | 759 | 9.108 | max-min | | 709 | 8.538 |

DISK ROTATION CONTROL APPARATUS WITH DECELERATION MEANS

FIELD OF THE INVENTION

The present invention relates to an apparatus for controlling the rotational speed of a disk type information recording medium when the recording medium rotates on its axis.

BACKGROUND OF THE INVENTION

In a disk player for reading information recorded in an information disk (hereinafter referred to simply as a disk), such as a compact disk (CD) or a video disk, the rotation of the disk is controlled so that the linear velocity of a light beam irradiating tracks on the disk relative to the disk is constant, on the basis of rotational information obtained from a reproduction signal from the disk. This control is referred to as a constant linear velocity (CLV) control. In the CLV control, recorded information is read out with an optical pick-up that is movable along the radial direction of the disk. On the other hand, for a disk recording or reproducing computer data, the rotation of the disk is controlled so that the rotational speed is equivalent to a constant angular velocity. This control is referred to as a constant angular velocity (CAV) control.

When control of disk rotation is started, i.e., when disk rotation is started, the rotation of the disk is accelerated until it reaches a prescribed rotational speed. When the rotational speed is reached, the above-mentioned CLV control or CAV control is performed. On the other hand, to stop the rotation of the disk, the rotation is decelerated, i.e., the rotational speed of the disk is decreased.

Further, the disk player is equipped with a focus servo system (hereinafter referred to simply as a focus servo) for controlling the optical pick-up so that a light beam for detecting information, emitted from the optical pick-up, is accurately focused on a recording surface of the disk, and a tracking servo system (hereinafter referred to simply as a tracking servo) for controlling the optical pick-up so that the beam spot accurately follows recording tracks on the disk.

A description is given of a conventional disk rotation control apparatus. When the apparatus is started, a disk is appropriately rotated, and a focus servo and a tracking servo are operated. In this state, when the rotational speed of the disk according to the position of a pick-up relative to the disk is appropriate, a reproduction signal (RF) synchronizes with a reference clock, and a PLL is locked.

FIG. 22($a$) shows a fundamental structure of a PLL. In FIG. 22($a$), an edge of a reproduction signal (a cross point of an eye pattern) is applied to the PLL as an input A, and a continuous oscillation waveform from a voltage controlled oscillator (VCO) is applied to the PLL as an input B. FIG. 22($b$) shows clock pulses applied to the PLL. It is assumed that the disk rotates at a speed lower than a target rotational speed for the position of the optical head relative to the disk. In this state, as shown in FIG. 22($b$)-(1), signals A and B input to a phase comparator are not synchronized with each other. When the rotational speed of the disk gradually increases, as shown in FIG. 22($b$)-(2), the PLL is suddenly locked. Since the oscillation frequency of the VCO is lower than the reference clock frequency, a steady-state error remains between the signals A and B. When the rotational speed further increases, as shown in FIG. 22($b$)-(3), the frequency of the clock component of the reproduced signal coincides with the frequency of the VCO, and the phase error between the signals A and B becomes zero. When the rotational speed further increases, as shown in FIG. 22($b$)-(4), the phase error between the signals A and B increases although the lock is maintained and, at last, the lock is released as shown in FIG. 22($b$)-(5). In the unlocked state, the frequency of the signal B becomes a self-oscillation frequency of the VCO.

In the state where the PLL is locked, the PLL generates a clock having a frequency equal to the frequency of the reference clock which is synchronized with the reproduction signal. The CLV control is to make the frequency of the clock output from the PLL equal to and synchronous with the frequency of the reference clock. Therefore, for the CLV control, it is necessary to rotate a motor for rotating the disk, until the state where the PLL can be locked is reached. For this purpose, a rough servo control mentioned below is employed. That is, since a maximum value ($T_{max}$) and a minimum value ($T_{min}$) of the lengths of signal pits written in the disk or the lengths of spaces between the pits are determined according to the modulation rule, after a signal read from the disk is digitized, the pulse lengths of the signal are measured, and a maximum length or a minimum length is detected from the measured pulse lengths. The rough servo control is to control the spindle motor so that the maximum length or the minimum length becomes a prescribed length.

When the rotation of the disk is controlled on the basis of the information from the reproduction signal RF, even though the tracking servo is operated, off tracking sometimes occurs if the tracking servo is moved due to unwanted disturbance applied to the apparatus, for example, vibration or distortion of the disk surface. When the rotation of the disk is controlled according to the minimum or maximum time length (pulse length) obtained from the reproduction signal as described above, if such off tracking occurs, the minimum time length $T_{min}$ or the maximum time length $T_{max}$ is detected incorrectly, and the rotational variation unfavorably increases although the rotation is controlled.

This problems is solved in a disk rotation control apparatus disclosed in Japanese Published Patent Application No. Hei. 5-109182, which apparatus is equipped with means for detecting a tracking error. When a tracking error exceeding a prescribed value is detected, control of a spindle motor on the basis of a reproduction signal RF is suppressed so that the tracking error is not recognized, whereby runaway servo control due to disturbance is avoided.

However, the prior art disk rotation control apparatus has the following drawbacks.

First, when the rotation of the disk is decelerated to stop the rotation by applying a current in the opposite direction to that for the normal rotation, to the spindle motor, the following problem occurs.

When a plurality of disks of different kinds, for example, different diameters or masses, which are rotated by spindle motors, are decelerated to stop the rotation under the same condition, because the disks of different kinds have different inertial moments, some disks are reversely rotated due to over-deceleration and some disks are not completely stopped, while others are normally stopped.

Further, when rotation of a disk is controlled by the CLV method, the rotational speed of the disk varies according to the position of a light beam emitted from the optical pick-up along the radical direction of the disk. Therefore, in a disk rotation control apparatus performing the CLV control, when the rotation of the disk is decelerated to stop the disk from different rotating states of the disk with different rotational speeds under the same condition, whether the disk stops accurately or not depends on the rotational speed of the disk at the start of the operation to stop the disk.

Alternatively, there is a general method for stopping rotation of a disk, wherein the rotation of the disk is decelerated by controlling a spindle motor and, when the rotational speed of the disk reaches a prescribed speed, the deceleration of the rotation is stopped so that the disk stops spontaneously. However, also in this method, when the CLV control is employed, whether the disk stops accurately or not depends on the rotational speed of the disk at the start of the operation to stop the disk, and reverse rotation of the disk occurs sometimes.

Furthermore, a frequency generator is considered as means for measuring the rotational speed of the disk. Although a frequency generator is an effective means for detecting rotational information at the acceleration of the rotation, since the period of a pulse signal output from the frequency generator becomes long at the deceleration, the pulse signal is adversely affected by noise, whereby false detection of rotational information easily occurs. As a result, the disk rotates reversely due to over-deceleration.

By the way, in a disk rotation control apparatus as mentioned above, when the tracking servo is operated, there are two modes for the rough servo control, i.e., a servo control by $T_{max}$ and a servo control by $T_{min}$, and a CLV servo mode for the fine servo control. In the $T_{min}$ servo control, the minimum time length $T_{min}$ of the reproduction signal is detected and the disk rotation is controlled according to the minimum time length $T_{min}$. In the $T_{max}$ servo control, the maximum time length $T_{max}$ of the reproduction signal is detected and the disk rotation is controlled according to the maximum time length $T_{max}$. However, when the tracking servo is not operated, in both the $T_{min}$ detection and the $T_{max}$ detection, values different from correct values of minimum and maximum time lengths are detected every time the beam spot crosses the track center. Therefore, the rotational variation of the disk increases although the rotation of the disk is controlled. Further, since false detection of $T_{min}$ and $T_{max}$ increases, the rotation control system is saturated if the control loop gain is the same as that for the tracking control. So, the loop gain must be set at a low value. Consequently, it is not possible to increase the control loop gain.

When the $T_{min}$ servo control is performed, since the value obtained by the false detection is smaller than the target value, the rotation control apparatus incorrectly recognizes that the disk is rotated at a rotational speed higher than the target rotational speed. Therefore, in the worst case, the rotation of the disk is stopped.

On the other hand, when the $T_{max}$ servo control is performed, since the value obtained by the false detection is larger than the target value, the rotation control apparatus recognizes that the disk rotates at a rotational speed lower than the target rotational speed. This results in, in the worst case, runaway operation of the disk rotation control system.

In both cases where the tracking servo is not operated and where it is operated, when rotation of a disk is controlled on the basis of the minimum time length $T_{min}$ or the maximum time length $T_{max}$ obtained from the reproduction signal, if the focus servo is moved due to disturbance applied to the apparatus and the light beam is defocused, false detection of $T_{min}$ or $T_{max}$ occurs, whereby the rotational variation increases unfavorably even though the rotation is controlled.

When the tracking servo is not operated, off tracking, i.e., deviation of the beam spot from the center of the track on the disk, occurs. However, even when the tracking servo is operated, off tracking occurs if the tracking servo is moved by disturbance applied to the apparatus. When the rotation of the disk is controlled on the basis of the minimum time length $T_{min}$ or the maximum time length $T_{max}$ obtained from the reproduction signal, such off-tracking causes false detection of $T_{min}$ or $T_{max}$, whereby the rotational variation increases though the rotation is controlled.

Furthermore, in the conventional disk player equipped with the servo systems as mentioned above, when a recording surface of a disk to be reproduced has an abnormal portion, such as a defect or a flaw, and a beam spot for reading information traces a track in the abnormal portion, an error signal in the servo system is disturbed, whereby the disk player is in danger of malfunction, such as focus servo jumping or tracking servo jumping. In order to avoid the malfunction, when the abnormal portion on the recording surface is detected, the loop gain in the servo system is changed, or the servo control is performed while holding an error value just before the detection of the abnormal portion, or the servo loop is opened. Thereby, stable focus servo control or tracking servo control is performed without a risk of focus servo jumping or tracking servo jumping due to a defect or a flaw on the recording surface of the disk. As a result, the track follow-up ability of the focus servo or the tracking servo is improved. However, such an abnormal portion on the recording surface causes an omission of the reproduction signal, whereby the lock of the PLL is released, resulting in malfunction of the CLV control system or malfunction of the rough servo system due to false detection of $T_{max}$ or $T_{min}$.

Furthermore, the characteristics of the disk rotation control system vary according to the diameter or the mass of the disk. For example, when a 12 cm CD disk and an 8 cm CD disk are compared, since the inertial moment of the 8 cm disk at the rotation is smaller than that of the 12 cm disk, the loop gain intersection of the disk rotation control system for the 8 cm disk is higher than that for the 12 cm disk. FIG. 23 shows $T_{min}$ control loop characteristics for the 12 cm disk, and the measurement is performed on the innermost circumference of the disk. FIG. 24 shows $T_{min}$ control loop characteristics for the 8 cm disk, and the measurement is performed on the innermost circumference of the disk. For the 8 cm disk, in order to obtain a gain intersection at a frequency approximately equal to that of the 12 cm disk, i.e., 2.291 Hz, the gain of the 8 cm disk is set at 1/3.2 of the gain of the 12 cm disk. Therefore, it is found from FIGS. 23 and 24 that the loop gain of the 8 cm disk is 3.2 times as high as the loop gain of the 12 cm disk. In this case, even when the loop characteristics are stable for the 12 cm disk, stable loop characteristics cannot be secured for the 8 cm disk.

SUMMARY OF THE INVENTION

It is an object of the present invention to provide a disk rotation control apparatus that can stop rotation of disks accurately without variations in the stop time and that can prevent the disks from rotating reversely due to over-deceleration, even when the disks have different diameters or masses, or the disks have different rotational speeds according to the position of the optical pick-up.

It is another object of the present invention to provide a disk rotation control apparatus that can prevent malfunction of a disk rotation control system due to omission of a rotational information signal.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a disk rotation control apparatus comprises a spindle motor for rotating a disk; a rotational speed detecting means for detecting the rotational speed of the spindle motor; a signal generating means for generating an acceleration signal that accelerates the rotation of the spindle motor and a deceleration signal that decelerates the rotation of the spindle motor; a storage means for rotating the spindle motor with an acceleration signal generated by the signal generating means, measuring a rise time required to reach a prescribed rotational speed $\omega1$ while detecting the rotational speed of the spindle motor by the rotational speed detecting means, and storing the measured rise time; and a control means for deciding a time to generate the deceleration signal in the signal generating means on the basis of the rise time stored in the storage means, and stopping the rotation of the spindle motor by applying the deceleration signal to the spindle motor. Therefore, even when the diameter or the mass of the disk varies or the characteristics of the spindle motor or the driving circuit vary, undesired reverse rotation of the disk due to over-deceleration or undesired increase in the time required to stop the disk is avoided. As a result, the rotation of the disk can be stopped with high reliability.

According to a second aspect of the present invention, a disk rotation control apparatus comprises a spindle motor for rotating a disk; a rotational speed detecting means for detecting the rotational speed of the spindle motor; a signal generating means for generating an acceleration signal that accelerates the rotation of the spindle motor and a deceleration signal that decelerates the rotation of the spindle motor; a storage means for rotating the spindle motor with an acceleration signal generated by the signal generating means, measuring a rise time required to reach a prescribed rotational speed $\omega1$ while detecting the rotational speed of the spindle motor by the rotational speed detecting means, and storing the measured rise time; and a control means for detecting a rotational speed $\omega2$ of the spindle motor before generation of the deceleration signal by the rotational speed detecting means, deciding a time to generate the deceleration signal on the basis of the detected rotational speed $\omega2$ and the rise time stored in the storage means, and stopping the rotation of the spindle motor by applying the deceleration signal to the spindle motor. Therefore, even when the diameter or the mass of the disk varies, or the characteristics of the spindle motor or the driving circuit vary, or the rotational speed of the disk varies, undesired reverse rotation of the disk due to over-deceleration or undesired increase in the time required to stop the disk is avoided. As a result, the rotation of the disk can be stopped with high reliability.

According to a third aspect of the present invention, a disk rotation control apparatus comprises a spindle motor for rotating a disk; an optical pick-up for reproducing information recorded on the disk; a time length detecting means for detecting a minimum time length of a reproduction signal output from the optical pick-up; and a rotation control means for controlling the rotational speed of the spindle motor on the basis of a difference between the minimum time length detected by the time length detecting means and a prescribed target time length, wherein the control by the rotation control means is suppressed when the minimum time length detected by the time length detecting means is smaller than a prescribed value. Therefore, even when the recording surface of the disk has an abnormal portion, such as a defect or a flaw, sudden decrease in the rotational speed of the disk due to false detection of the minimum time length or unwanted stop of the rotation of the disk is avoided. Further, even when defocusing or off tracking occurs due to disturbance applied to the apparatus, such a malfunction of the rotation control system is avoided. Even when tracking control is not performed, the rotation of the disk can be controlled with high reliability. Furthermore, since the minimum value of the time length of the reproduction signal obtained from the optical pick-up is detected and a lower limit is given to this value, even when tracking control is not performed, false detection of the minimum value is reduced, whereby rotational variation is reduced.

According to a fourth aspect of the present invention, a disk rotation control apparatus comprises a spindle motor for rotating a disk; an optical pick-up for reproducing information recorded on the disk; a time length detecting means for detecting a maximum time length of a reproduction signal output from the optical pick-up; and a rotation control means for controlling the rotational speed of the spindle motor on the basis of a difference between the maximum time length detected by the time length detecting means and a prescribed target time length, wherein the control by the rotation control means is suppressed when the maximum time length detected by the time length detecting means is larger than a prescribed value. Therefore, even when the recording surface of the disk has an abnormal portion, such as a defect or a flaw, sudden increase in the rotational speed of the disk due to false detection of the maximum time length, or unwanted runaway operation of the rotation control system, is avoided. Further, even when defocusing or off tracking occurs due to disturbance applied to the apparatus, such a malfunction of the rotation control system is avoided. Even when tracking control is not performed, the rotation of the disk can be controlled with high reliability. Therefore, stability and reliability of the apparatus are significantly improved.

According to a fifth aspect of the present invention, a disk rotation control apparatus comprises a spindle motor for rotating a disk; an optical pick-up for reproducing information recorded on the disk; a focus control means for controlling the optical pick-up so that a light beam emitted from the optical pick-up is accurately focused on the disk, according to a focus error signal output from the optical pick-up; a defocus detecting means for detecting that the light beam is defocused, when the focus error signal exceeds a prescribed value during the operation of the focus control means; a time length detecting means for detecting a time length of a reproduction signal output from the optical pick-up; and a rotation control means for controlling the rotational speed of the spindle motor on the basis of a difference between the time length detected by the time length detecting means and a prescribed target time length, wherein the control by the rotation control means is suppressed when the defocus is detected by the defocus detecting means. Therefore, even when the recording surface of the disk has an abnormal portion, such as a defect or a flaw, sudden decrease in the rotational speed of the disk due to false detection of the minimum time length or sudden increase in the rotational speed due to false detection of the maximum time length is avoided, so that unwanted stop of the rotation or unwanted runaway operation of the rotation control system is avoided. Further, even when defocusing or off tracking occurs due to disturbance applied to the apparatus, such a malfunction of the rotation control system is avoided. Even when tracking control is not performed, the rotation of the disk can be controlled with high reliability. Therefore, stability and reliability of the apparatus are significantly improved.

According to a sixth aspect of the present invention, the above-mentioned disk rotation control apparatus further comprises a tracking control means for controlling the optical pick-up so that the light beam focused on the disk is positioned on a track, according to a tracking error signal output from the optical pick-up; and off tracking detecting means for detecting that the light beam is off from the center of the track by a prescribed value or more, according to a tracking error signal. The control by the rotation control means is suppressed when the defocus is detected by the defocus detecting means or when the off tracking is detected by the off tracking detecting means. Therefore, even when the recording surface of the disk has an abnormal portion, such as a defect or a flaw, sudden decrease in the rotational speed of the disk due to false detection of the minimum time length or sudden increase in the rotational speed due to false detection of the maximum time length is avoided, so that unwanted stop of the rotation or unwanted runaway operation of the rotation control system is avoided. Further, even when defocusing or off tracking occurs due to disturbance applied to the apparatus, such a malfunction of the rotation control system is avoided. Even when tracking control is not performed, the rotation of the disk can be controlled with high reliability. Therefore, stability and reliability of the apparatus are significantly improved.

According to a seventh aspect of the present invention, a disk rotation control apparatus comprises a spindle motor for rotating a disk; an optical pick-up for reproducing information recorded on the disk; a tracking control means for controlling the optical pick-up so that a light beam emitted from the optical pick-up and focused on the disk is positioned on a track on the disk, according to a tracking error signal output from the optical pick-up; a time length detecting means for successively measuring minimum time lengths of a reproduction signal output from the optical pick-up, deciding a minimum time length of the reproduction signal on the basis of the measured N values of the minimum time lengths, and outputting the decided minimum time length; and a rotation control means for controlling the rotational speed of the spindle motor on the basis of a difference between the minimum time length output from the time length detecting means and a prescribed target time length. The time length detecting means outputs a minimum value among the measured N values as the minimum time length of the reproduction signal when the tracking control means operates, and outputs a maximum value among the measured N values as the minimum time length of the reproduction signal when the tracking control means does not operate. In this apparatus, since the minimum value of the time length of the reproduction signal obtained from the optical pick-up is detected and a lower limit is given to this value, even when tracking control is not performed, false detection of the minimum value is reduced, whereby rotational variation is reduced. Further, since the rotation control system is not saturated with the same control loop gain as that at the time of tracking control, the same control loop gain as that for the tracking control is secured. As a result, the track follow-up ability of the rotation control system at seeking is improved.

According to an eighth aspect of the present invention, in the above-mentioned disk rotation control apparatus, when a difference between a minimum time length $T_{min}1$ output from the time length detecting means and a minimum time length $T_{min}0$ output from the time length detecting means in advance of $T_{min}1$ exceeds a prescribed value, the rotation control means applies a signal corresponding to the difference between the minimum time length $T_{min}0$ and the target time length to the spindle motor. Therefore, even when the recording surface of the disk has an abnormal portion, such as a defect or a flaw, sudden decrease in the rotational speed of the disk due to false detection of the minimum time length or sudden increase in the rotational speed due to false detection of the maximum time length is avoided, so that unwanted stop of the rotation or unwanted runaway operation of the rotation control system is avoided. Further, even when defocusing or off tracking occurs due to disturbance applied to the apparatus, such a malfunction of the rotation control system is avoided. Even when tracking control is not performed, the rotation of the disk can be controlled with high reliability. Therefore, stability and reliability of the apparatus are significantly improved.

According to a ninth aspect of the present invention, a disk rotation control apparatus comprises a spindle motor for rotating a disk; an optical pick-up for reproducing information recorded on the disk; a tracking control means for controlling the optical pick-up so that a light beam emitted from the optical pick-up and focused on the disk is positioned on a track on the disk, according to a tracking error signal output from the optical pick-up; a time length detecting means for successively measuring maximum time lengths of a reproduction signal output from the optical pick-up, deciding a maximum time length of the reproduction signal on the basis of the measured N values of the maximum time lengths, and outputting the decided maximum time length; and a rotation control means for controlling the rotational speed of the spindle motor on the basis of a difference between the maximum time length output from the time length detecting means and a prescribed target time length. The time length detecting means outputs a minimum value among the measured N values as the maximum time length of the reproduction signal when the tracking control means operates, and outputs a minimum value among the measured N values as the maximum time length of the reproduction signal when the tracking control means does not operate. In this apparatus, since the maximum value of the time length of the reproduction signal obtained from the optical pick-up is detected and an upper limit is given to this value, even when tracking control is not performed, false detection of the maximum value is reduced, whereby rotational variation is reduced. Further, since the same control loop gain as that for the tracking control is secured, the track follow-up ability of the rotation control system at seeking is improved.

According to a tenth aspect of the present invention, in the above-mentioned disk rotation control apparatus, when a difference between a maximum time length $T_{max}1$ output from the time length detecting means and a maximum time length $T_{min}0$ output from the time length detecting means in advance of $T_{max}1$ exceeds a prescribed value, the rotation control means applies a signal corresponding to the difference between the maximum time length $T_{max}0$ and the target time length to the spindle motor. Therefore, even when the recording surface of the disk has an abnormal portion, such as a defect or a flaw, sudden decrease in the rotational speed of the disk due to false detection of the minimum time length or sudden increase in the rotational speed due to false detection of the maximum time length is avoided, so that unwanted stop of the rotation or unwanted runaway operation of the rotation control system is avoided. Further, even when defocusing or off tracking occurs due to disturbance applied to the apparatus, such a malfunction of the rotation control system is avoided. Even when tracking control is not performed, the rotation of the disk can be controlled with high reliability. Therefore, stability and reliability of the apparatus are significantly improved.

According to an eleventh aspect of the present invention, a disk rotation control apparatus comprises a spindle motor for rotating a disk; an optical pick-up for reproducing information recorded on the disk; a minimum time length measuring means for measuring a minimum time length of a reproduction signal output from the optical pick-up; a maximum time length measuring means for measuring a maximum time length of the reproduction signal output from the optical pick-up; a rotation control means for controlling the rotational speed of the spindle motor on the basis of a difference between the minimum time length measured by the minimum time length measuring means or the maximum time length measured by the maximum time length measuring means and a prescribed target time length; and a calculating means for calculating a ratio of the minimum time length measured by the minimum time length measuring means to the maximum time length measured by the maximum time length measuring means. The rotation control means judges that the rotation control is abnormal when the ratio of the minimum time length measured by the minimum time length measuring means to the maximum time length measured by the maximum time length measuring means is out of a prescribed range, and the rotation control means deals with the abnormal rotation control by restarting the disk rotation control or by stopping the rotation of the disk. Therefore, even when the rotation of the disk is abnormal, this abnormal rotation does not continue. As a result, reliability of the disk is improved, and breakage of the disk is avoided.

According to a twelfth aspect of the present invention, a disk rotation control apparatus comprises a spindle motor for rotating a disk; an optical pick-up for reproducing information recorded on the disk; a time length detecting means for detecting a time length of a reproduction signal output from the optical pick-up; and a rotation control means for controlling the rotational speed of the spindle motor on the basis of a difference between the time length detected by the time length detecting means and a prescribed target time length. The rotation control means judges that the rotation control is abnormal when a state where the time length detected by the time length detecting means deviates from the target time length continues for a prescribed period of time, and the rotation control means deals with the abnormal rotation control by restarting the disk rotation control or by stopping the rotation of the disk. Therefore, even when the rotation of the disk is abnormal, this abnormal rotation does not continue. As a result, reliability of the disk is improved, and breakage of the disk is avoided.

According to a thirteenth aspect of the present invention, a disk rotation control apparatus comprises a spindle motor for rotating a disk; a rotational speed detecting means for detecting the rotational speed of the spindle motor; a signal generating means for generating an acceleration signal that accelerates the rotation of the spindle motor; a measuring means for rotating the spindle motor with an acceleration signal generated by the signal generating means, and measuring a rise time required to reach a prescribed rotational speed $\omega 1$ while detecting the rotational speed of the spindle motor by the rotational speed detecting means; a disk discriminating means for discriminating the kind of the disk on the basis of the rise time measured by the measuring means; and a loop characteristics change means for changing the characteristics of a disk rotation control loop on the basis of the result from the disk discriminating means. Therefore, even when the diameter or the mass of the disk varies, since the characteristics of the disk rotation control system are changed according to the kind of the disk, the rotation of the disk can be controlled with high reliability.

According to a fourteenth aspect of the present invention, in the above-mentioned disk rotation control apparatus, the loop characteristics change means changes the loop gain of the disk rotation control loop on the basis of the rise time measured by the measuring means. Therefore, even when the diameter or the mass of the disk varies, since the characteristics of the disk rotation control system are changed according to the kind of the disk, the rotation of the disk can be controlled with high reliability.

BRIEF DESCRIPTION OF THE DRAWINGS

FIG. 22(*a*) is a block diagram illustrating a fundamental structure of a PLL as a constituent of a disk rotation control apparatus, and FIG. 22(*b*) illustrates waveforms of clock pulses applied to the PLL.

FIG. 25 is a table showing measured data of disk rotation rise time.

DETAILED DESCRIPTION OF THE PREFERRED EMBODIMENTS

[Embodiment 1]

Figure 1:
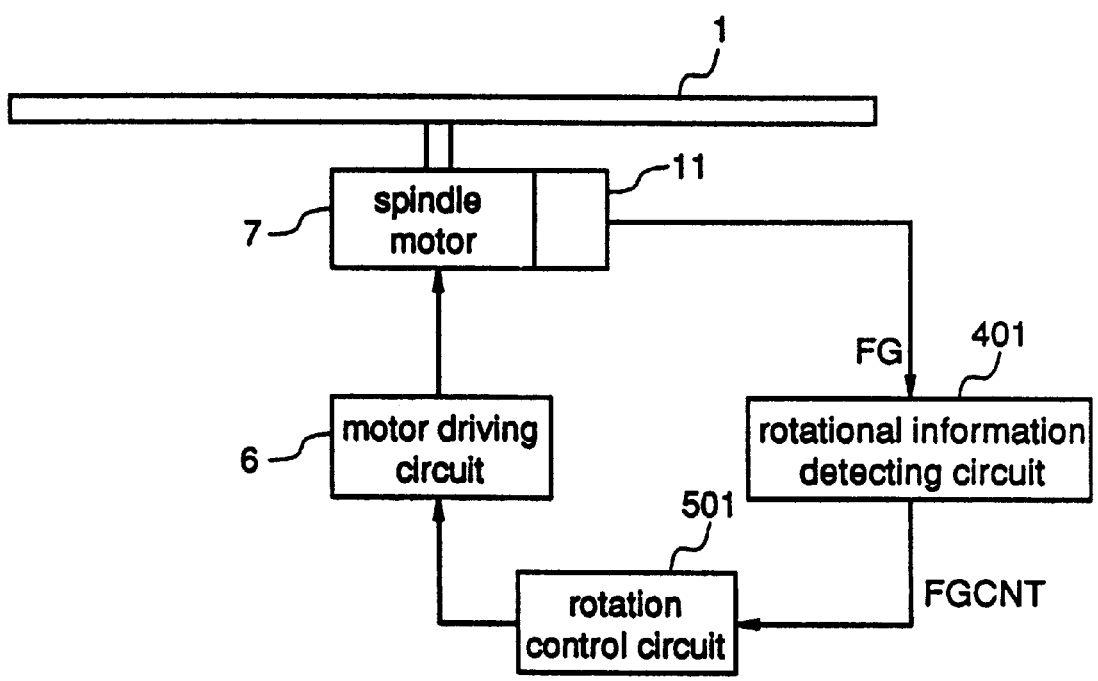
FIG. 1 is a block diagram illustrating a disk rotation control apparatus in accordance with a first embodiment of the present invention.

FIG. 1 is a block diagram illustrating a disk rotation control apparatus according to a first embodiment of the invention. In FIG. 1, reference numeral 1 is a disk type information recording medium, such as an optical disk (hereinafter referred to simply as a disk), and reference numeral 7 designates a spindle motor. The disk 1 is mounted on the spindle motor 7 so that the center is positioned on a rotation axis of the spindle motor 7. Reference numeral 11 designates a frequency generator for generating a pulse signal in response to the rotational speed of the spindle motor 7. For example, the frequency generator 11 generates a pulse signal FG of 6 pulses for one rotation. Therefore, information on the rotation of the spindle motor 7 is obtained from the frequency generator 11. Reference numeral 401 designates a rotational information detecting circuit receiving the pulse signal FG output from the frequency generator 11. The rotational information detecting circuit 401 detects a frequency of the pulse signal FG output from the frequency generator 11 and outputs the frequency as a rotational information signal FGCNT. Reference numeral 501 designates a rotation control circuit to which the rotational information signal FGCNT is input, and numeral 6 designates a motor driving circuit for driving the spindle motor 7 in response to an output from the rotation control circuit 501.

Hereinafter, the operation of the disk rotation control apparatus will be described.

When rotation of the disk 1 is started, the rotation control circuit 501 applies an acceleration signal to the spindle motor 7 through the motor driving circuit 6. Then, the rotation control circuit 501 measures a time required to reach a target rotational speed from the start of the rotation, i.e., a rise time, on the basis of the rotational information signal FGCNT and stores this rise time. During the steady-state operation of the disk rotation control apparatus, the rotation control circuit 501 drives the spindle motor 7 through the motor driving circuit 6 with a rotation control signal on the basis of the rotational information signal FGCNT so that a constant rotational speed of the disk 1 is maintained.

In order to stop the rotation of the disk 1, the rotation control circuit 501 applies a deceleration signal to the spindle motor 7 through the motor driving circuit 6, for a period of time decided on the basis of the rise time stored at the start of the rotation. In this way, the rotation control circuit 501 stops the rotation of the disk 1.

When a plurality of disks of the same kind are started by the same apparatus, the rise times of these disks are equal to each other. However, when a plurality of disks of different kinds, i.e., different masses or diameters, are compared, the rise times vary in proportion to the masses or diameters of the disks.

Hereinafter, the relationship between the rise time of a disk and the mass or the diameter of the disk will be described. When the mass is m, the radius is a, and the inertial moment of the disk is JD, the following relationship stands.

$$JD = m \times (a^2)/4 \qquad (1)$$

According to formula (1), the mass m of the disk is in proportion to the inertial moment JD of the disk, and the square of the radius a, i.e., $a^2$, is in proportion to the inertial moment JD. Therefore, with an increase in the mass m or the radius a of the disk, the inertial moment JD of the disk increases.

Next, the transfer function G(S) of the dc motor is shown, and the relationship between the inertial moment J and the time constant τ (especially, the mechanical time constant τM) will be described. The transfer function G(S) of the dc motor is given by $$G(S) = (1/KE)/\{(S\tau E + 1)(S\tau M + 1)\} \qquad (2)$$

where τE is the electrical time constant, and KE is the back electromotive force coefficient.

When the armature inductance is L, the armature resistance is R, the torque coefficient is KT, and the inertial moment of the rotor is JM, the following relationship stands.

$$L \ll JM \times R^2/(4 \ KE \ KT) \qquad (3)$$

So, the electrical time constant τE and the mechanical time constant τM are given by $$\tau E = L/R \qquad (4)$$

$$\tau M = R \times JM/(KE \times KT) \qquad (5)$$

Figure 2:
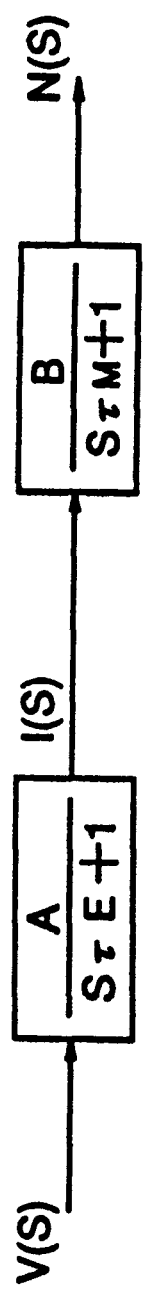
FIGS. 2(a) and 2(b) are diagrams for explaining step response characteristics of a spindle motor included in the apparatus shown in FIG. 1.
Figure 2:
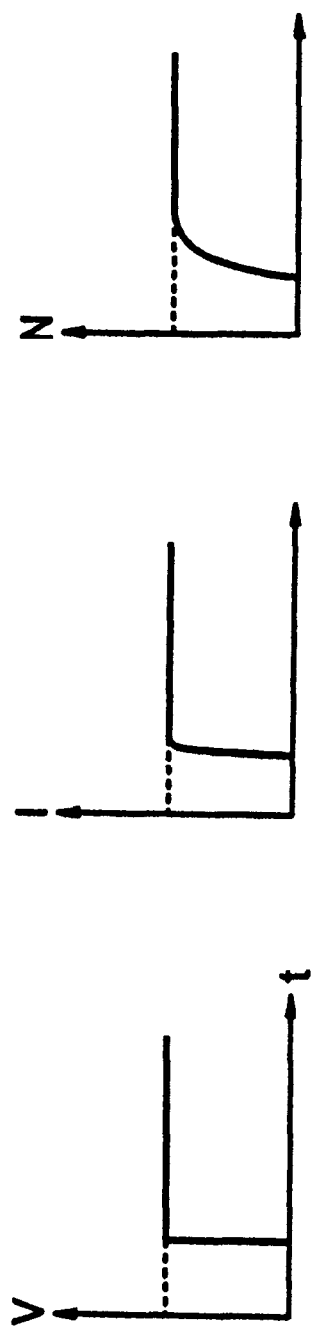

Since the electrical time constant τE and the mechanical time constant τM have the relationship, τE≪τM, τM is dominant with respect to the rise time of the motor. FIG. 2(*a*) is a block diagram showing the simplified transfer function of the motor. FIG. 2(*b*) shows waveforms in response to step inputs to the motor. From FIGS. 2(*a*) and 2(*b*), the relationship between the time constant (τE or τM) and the time lag is obtained. Since the electrical time constant τE is smaller than the mechanical time constant τM as mentioned above, it is supposed from the step response waveforms shown in FIG. 2(*b*) that the response by the electrical time constant is faster than the response by the mechanical time constant.

As shown in formula (5), the mechanical time constant τM is in proportion to the inertial moment J, so that the mechanical time constant τM increases with an increase in the inertial moment J. In addition, the inertial moment J is given by $$J = JM + JL \qquad (6)$$

where JM is the inertial moment of the motor and JL is the inertial moment of the load.

Assuming that the inertial moment JL of the load is approximately equal to the inertial moment JD of the disk, formula (6) is converted to $$J=JM+JD \qquad (7)$$

When the disk 1 is changed for a disk of different mass m or different radius a, for example, when a 12 cm disk is changed for an 8 cm disk, the inertial moment JD of the disk changes. Since the inertial moment J changes with the change in the inertial moment JD, the mechanical time constant τM also changes. That is, when a 12 cm disk is changed for an 8 cm disk, the rise time of the motor changes. So, the rise time of the motor for the 12 cm disk is different from the rise time of the motor for the 8 cm disk.

Next, a description is given of deceleration characteristics when a deceleration signal is applied to the spindle motor. First, at the deceleration, since the rotational speed of the disk decreases against the rotation of the disk, the disk is influenced by the back electromotive force, so that the deceleration is faster than the acceleration at the start of the rotation. Therefore, the deceleration signal applying time may be shorter than the acceleration signal applying time at the start of the rotation, i.e., the rise time. Secondly, even when the driving voltage, i.e., a voltage applied to the motor, is made zero to stop the rotation of the disk, since the disk is subjected to the back electromotive force and the mechanical friction, the rotation of the disk stops after a while.

Table 1 shows disk rotation rise times Tr until a target rotational speed, 1000 r.p.m. is reached, which are measured, ten times, for a 12 cm disk and an 8 cm disk, when a logical FG detection error is 10 ms.

Since the average rise time of the 8 cm disk is 47.2 ms, the FG detection error of 10 ms appears as a rise time error of 21.18%.

Therefore, from the above-mentioned first and second deceleration characteristics, the deceleration signal applying time may be shorter than the rise time. Preferably, it is set at about 70–90% of the rise time to accurately stop the rotation of the disk. The deceleration signal applying time TBK to the spindle motor is given by $$TBK=Tr\times 0.8 \qquad (8)$$

wherein Tr is the rise time, and the coefficient of the rise time is 80%.

Figure 3:
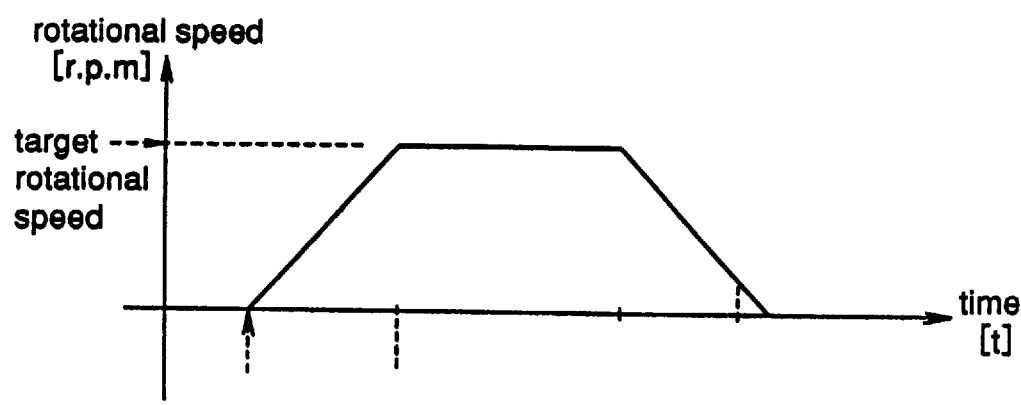
FIGS. 3(a) and 3(b) are diagrams illustrating the relationship between the rise time of the spindle motor and a spindle motor driving signal.
Figure 3:
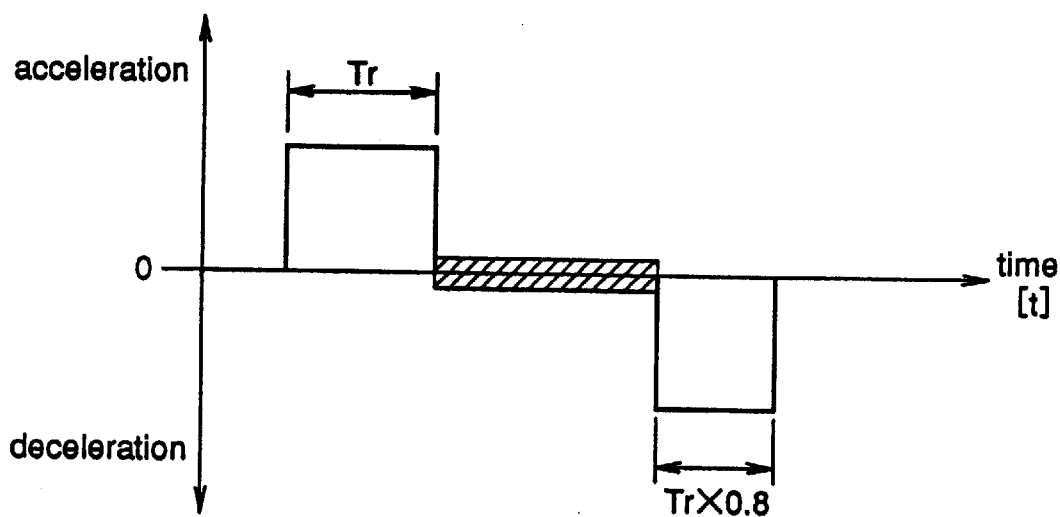

Consequently, the rotational speed of the disk and the driving signal have the relationship shown in FIGS. 3(*a*) and 3(*b*). That is, as shown in FIG. 3(*a*), after a period of time required for the disk to reach the target rotational speed, i.e., the rise time Tr, has passed, the spindle motor 7 is controlled so that the difference between the target rotational speed and the detected rotational speed becomes zero. In order to stop the rotation of the disk, as shown in FIG. 3(*b*), a deceleration signal is applied to the spindle motor 7 for Tr×0.8.

As described above, according to the first embodiment of the invention, since the deceleration signal applying time is varied according to the rise time of the disk, even when the diameter or the mass of the disk varies or the characteristics of the spindle motor or the driving circuit vary, unwanted reverse rotation of the disk due to over-deceleration or unwanted increase in the time required to stop the disk is avoided. As a result, the rotation of the disk can be stopped with high stability.

[Embodiment 2]

Figure 4:
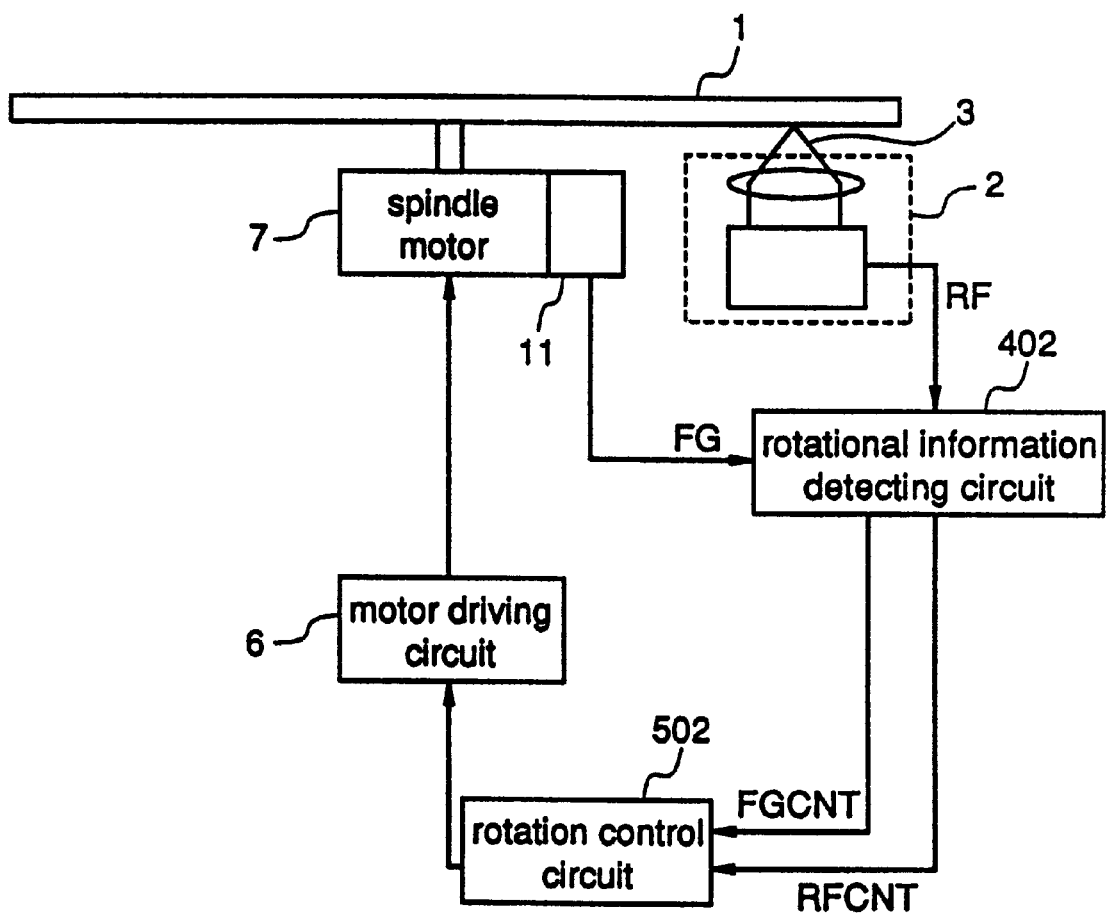
FIG. 4 is a block diagram illustrating a disk rotation control apparatus in accordance with a second embodiment of the invention.

FIG. 4 is a block diagram illustrating a disk rotation control apparatus according to a second embodiment of the invention. The disk rotation control apparatus according to the first embodiment of the invention is effective only when the rotational speed of the disk before it is stopped is equal to the rotational speed at the start of the rotation, regardless of the disk rotation control method, such as the CAV control or the CLV control. However, in this second embodiment of the invention, the rotation of the disk is controlled by the CLV control, and the rotational speed of the disk before it is stopped is not always equal to the rotational speed at the start of the rotation, that is, the rotating state of the disk changes during the operation. The structure shown in FIG. 4 is different from the structure shown in FIG. 1 in that a block required for explaining the CLV control, i.e., an optical pick-up 2, is added, and a rotational information detecting circuit 402 and a rotation control circuit 502 are used in place of the rotational information detecting circuit 401 and the rotation control circuit 501, respectively. In FIG. 4, the same reference numerals as those shown in FIG. 1 designate the same or corresponding parts.

A description is given of the operation of the disk rotation control apparatus.

The optical pick-up 2 irradiates a disk 1 with a light beam 3 for reproducing information recorded on the disk 1, reproduces the information on the disk 1 from the light beam 3 reflected by the disk 1, and outputs a reproduction signal RF to the rotational information detecting circuit 402. An output signal FG from the frequency generator 11 is also input to the rotational information detecting circuit 402. The rotational information detecting circuit 402 outputs a rotational information detecting signal FGCNT on the basis of an output from the frequency generator 11 and a rotational information detecting signal RFCNT on the basis of the reproduction signal RF. When rotation of the disk 1 is started, the rotation control circuit 502 applies an acceleration signal to the spindle motor 7 through the driving circuit 6. Then, the rotation control circuit 502 measures a time required to reach a prescribed rotational speed, i.e., a rise time, from the information signal FGCNT and stores the time. When the disk rotation control apparatus operates in the steady state, the rotation control circuit 502 generates a rotation control signal from the rotational information signal RFCNT on the basis of the reproduction signal RF. Then, the rotation control circuit 502 drives the spindle motor 7, through the motor driving circuit 6, in response to the rotation control signal and controls the rotation of the disk 1 so that the light beam 3 irradiating the disk 1 scans the track at a constant linear velocity (CLV control). Further, the rotation control circuit 502 detects the present rotational speed from the rotational information signal FGCNT. In order to stop the rotation of the disk 1, the rotation control circuit 502 applies a deceleration signal to the spindle motor 7 through the motor driving circuit 6, for a time decided according to two parameters, i.e., the rise time stored in the control circuit 502 at the start of the rotation, and the rotational speed of the disk just before the.application of the deceleration signal. In this way, the rotation control circuit 502 stops the rotation of the disk 1.

The relationship between the mass or the diameter of the disk and the rise time or the deceleration signal applying time is identical to that described for the first embodiment of the invention.

A description is now given of the relationship between the rotational speed before stop of the disk 1 and the deceleration signal applying time.

A target rotational speed at the start of rotation is in proportion to a rise time required to reach the target rotational speed. That is, when the target rotational speed is doubled, the rise time is doubled. When the target rotational speed is halved, the rise time is halved. That is, when the deceleration signal is applied to the rotating disk to stop the rotation of the disk, it is necessary to change the deceleration signal applying time according to the rotational speed of the disk before the application of the deceleration signal.

A description is given of the deceleration characteristics when rotation of a disk is stopped under the condition that the rotational speed of the disk before the application of the deceleration signal varies. First, at the deceleration, since the rotational speed of the disk decreases against the rotation of the disk, the disk is influenced by the back electromotive force, so that the deceleration is faster than the acceleration at the start of the rotation. Therefore, the deceleration signal applying time may be shorter than the acceleration signal applying time at the start of the rotation, i.e., the rise time. Secondly, even when the driving voltage, i.e., a voltage applied to the motor, is made zero to stop the rotation of the disk, since the disk is subjected to the back electromotive force and the mechanical friction, the rotation of the disk stops after a while. Thirdly, the deceleration signal applying time is in proportion to the rotational speed of the disk before the deceleration.

From the first to third deceleration characteristics mentioned above, it is found that a deceleration signal applying time is obtained by multiplying a time about 70%–90% of the rise time by a value obtained by dividing the rotational speed before the application of the deceleration signal with the rotational speed at the start of the rotation.

Therefore, a deceleration signal applying time TBK2 to stop the rotation of the disk under the condition that the rotational speed of the disk varies is given by $$TBK2 = Tr \times 0.8 \times (Njn/Nrd) \quad (9)$$

where Tr is the rise time, Njn is the rotational speed before the application of the deceleration signal, and Nrd is the target rotational speed at the start of the rotation. In formula (9), considering the first and second characteristics, 80% is adopted as a coefficient of the rise time.

Figure 5:
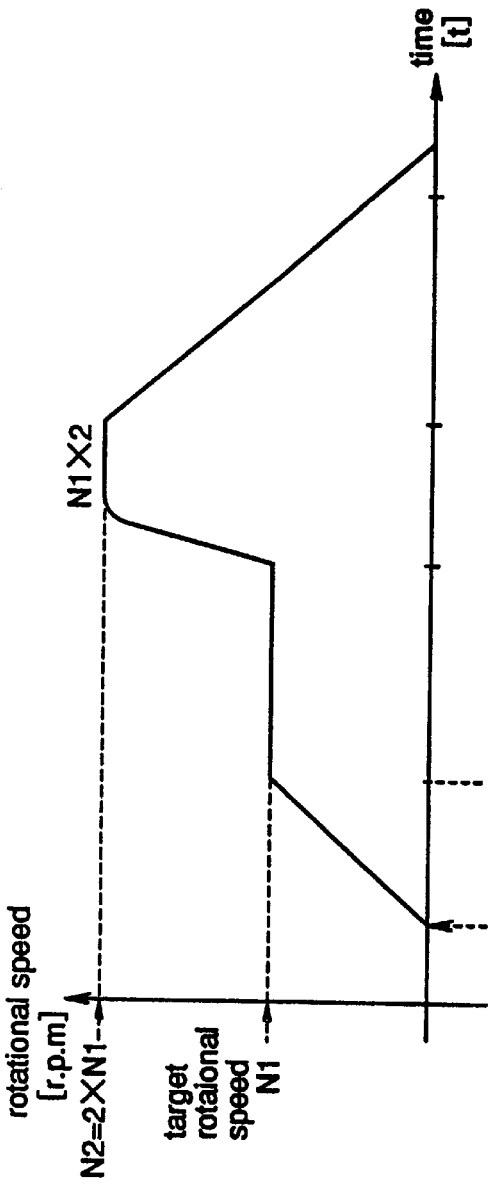
FIGS. 5(a) and 5(b) are diagrams illustrating the relationship between the rotational speed of the spindle motor and a spindle motor driving signal.
Figure 5:
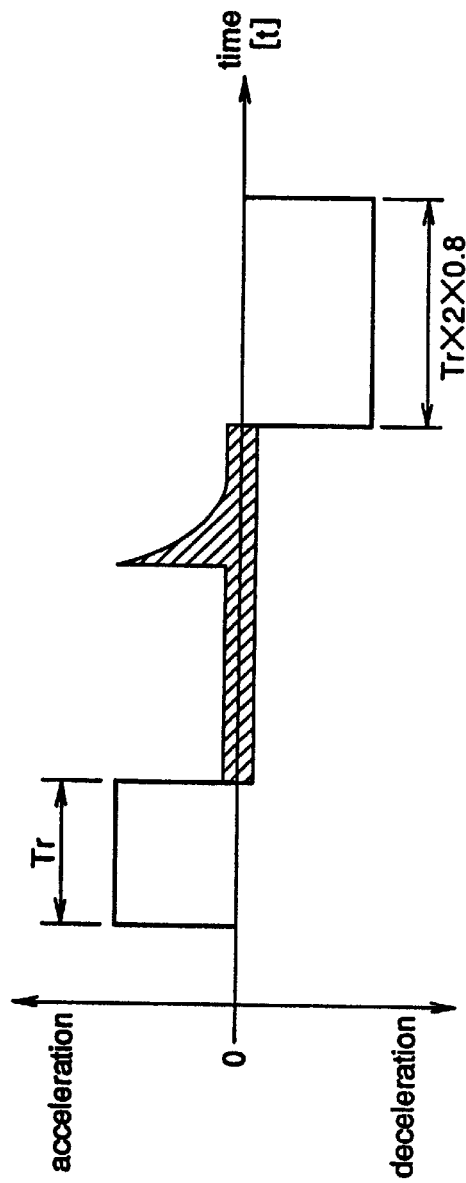

FIGS. 5($a$) and 5($b$) are graphs illustrating the relationship between the rotational speed of the disk and the motor driving signal. In order to stop the disk from the state where the rotational speed N2 just before the application of the deceleration signal is twice as high as the target rotational speed N1 as shown in FIG. 5($a$), a deceleration signal is applied for Tr×0.8×2, according to formula (9), as shown in FIG. 5($b$).

As described above, according to the second embodiment of the invention, the deceleration signal applying time is varied according to two parameters, i.e., the rise time of the disk and the rotational speed of the disk just before the application of the deceleration signal. Therefore, even when the diameter or the mass of the disk varies, or the characteristics of the spindle motor or the driving circuit vary, or the rotational speed of the disk before the application of the deceleration signal varies, undesired reverse rotation of the disk due to over-deceleration or undesired increase in the time required to stop the disk is avoided. As a result, the rotation of the disk can be stopped with high stability.

[Embodiment 3]

Figure 6:
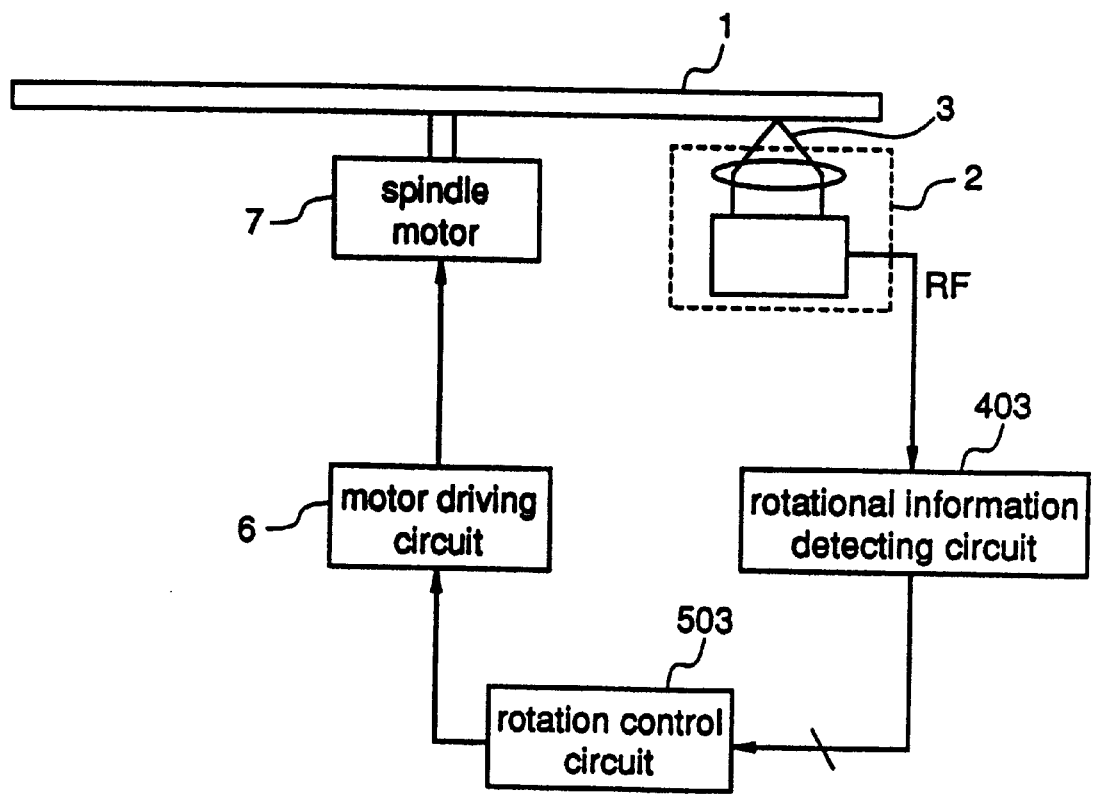
FIG. 6 is a block diagram illustrating a disk rotation control apparatus in accordance with a third embodiment of the invention.

FIG. 6 is a block diagram illustrating a disk rotation control apparatus according to a third embodiment of the invention. In FIG. 6, the same reference numerals as those shown in FIG. 1 designate the same or corresponding parts. Reference numeral 403 designates a rotational information detecting circuit constituting a time length detecting means. The rotational information detecting circuit 403 counts the pulse width of a reproduction signal RF, detects a minimum value and a maximum value of a minimum time length (minimum pulse width) of the reproduction signal, and detects a minimum value of a maximum time length (maximum pulse width) of the reproduction signal. Reference numeral 503 designates a rotation control circuit. The rotation control circuit 503 receives the minimum and maximums value of the minimum time length of the reproduction signal and the minimum value of the maximum time length of the reproduction signal, and outputs a rotation control signal for driving the spindle motor 7 employing any of the input values in accordance with the condition of the tracking operation.

Figure 7:
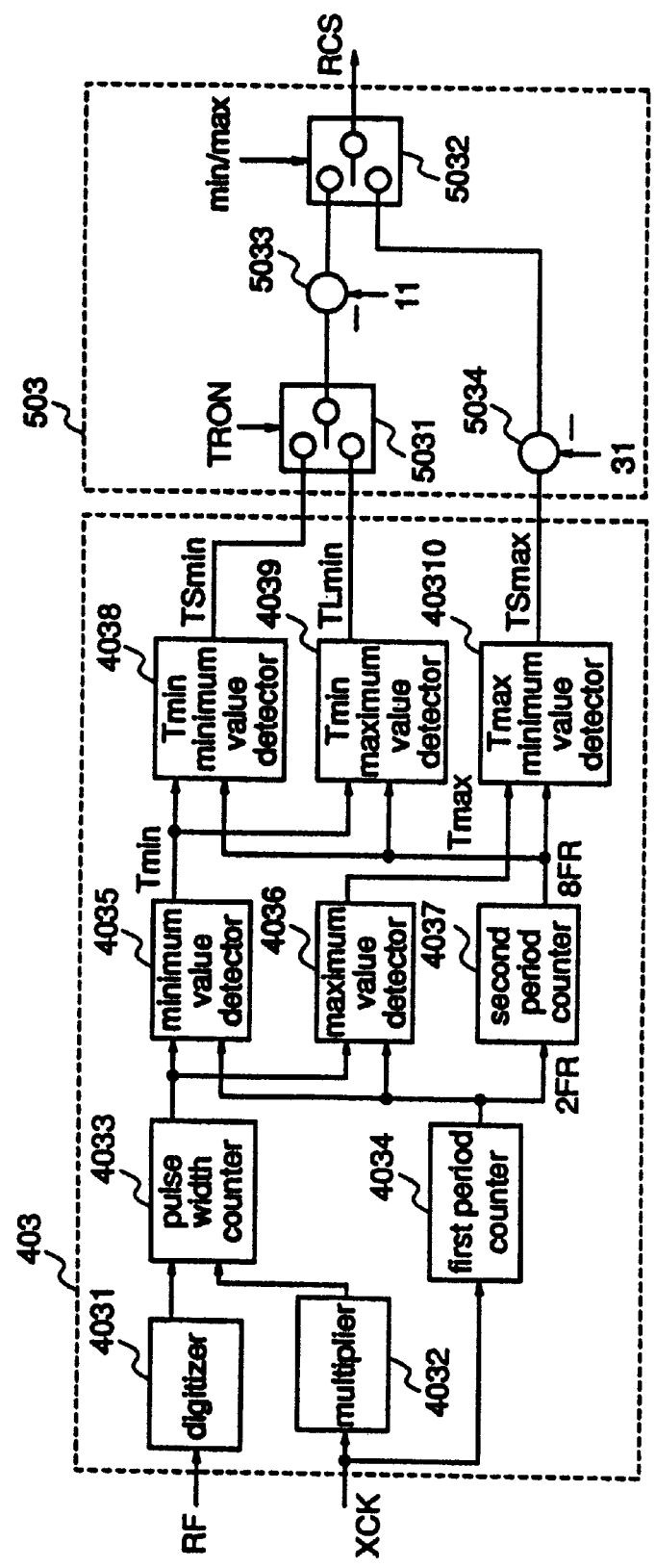
FIG. 7 is a block diagram illustrating, in detail, a rotational information detecting circuit and a rotation control circuit which are constituents of the disk rotation control apparatus shown in FIG. 6.

FIG. 7 is a block diagram illustrating the rotational information detecting circuit 403 and the rotation control circuit 503 in more detail. In FIG. 7, reference numeral 4031 designates a digitizer receiving the reproduction signal RF. Reference numeral 4032 designates a multiplier, and the multiplier 4032 receives a reproduction reference clock XCK and outputs a signal having a frequency twice as high as that of the clock XCK. Reference numeral 4033 designates a pulse width counter (TW counter) for counting the pulse width of the digitized RF signal. Reference numeral 4034 designates a first period counter. Reference numeral 4035 designates a detector for detecting a minimum value ($T_{min}$) of an output from the TW counter 4033 within a first period. Reference numeral 4036 designates a detector for detecting a maximum value ($T_{max}$) of an output from the TW counter 4033 within the first period. Reference numeral 4037 designates a second period counter. Reference numeral 4038 designates a detector for detecting a minimum value of $T_{min}$ within a second period. Reference numeral 4039 designates a maximum value of $T_{min}$ within the second period. Reference numeral 40310 designates a detector for detecting a minimum value of $T_{max}$.

A description is now given of the operation of the rotational information detecting circuit 403. Initially, an RF signal reproduced by the optical pick-up 2 is input to the digitizer 4031, wherein the RF signal is converted to an RF pulse signal digitized with a prescribed threshold. When the rotational speed of the disk 1 is fixed, the RF pulse signal has a pulse width that changes within a given range dependent on the modulation rule of data recorded in the disk 1, and the same $T_{min}$ and the same $T_{max}$ are obtained within a given period. Therefore, the minimum value detector 4035 detects a minimum value $T_{min}$ of the time length of the RF pulse signal within the given period, and the maximum value detector 4036 detects a maximum value $T_{max}$ of the time length of the RF pulse signal. As described above, the minimum value $T_{min}$ and the maximum value $T_{max}$ are always fixed values, respectively, as long as the rotational speed of the disk is fixed, so that the ratio between $T_{min}$ and $T_{max}$ is fixed. As an example of the modulation rule, 8–15 modulation is employed. In this case, the minimum recorded data is as long as three periods of the reproduction clock (3T), and the maximum recorded data is as long as sixteen periods of the reproduction clock (16T). The minimum time length is equal to a series of minimum recorded data 3T and, in this second embodiment, it is 6T (3T×2). The maximum time length is equal to the maximum recorded data 16T. The multiplexer 4032 generates a clock 2XCK having a frequency twice as high as that of the reproduction reference clock XCK. When the pulse width of the RF pulse signal is counted with the clock 2XCK, rotational information TW is obtained. This rotational information TW is input to the minimum value detector 4035 and the maximum value detector 4036. The minimum value detector 4035 detects a minimum value of TW in every first period and outputs the value as $T_{min}$. The maximum value detector 4036 detects a maximum value of TW in every first period and outputs the value as $T_{max}$. If it is assumed that the rotational speed of the disk is the target rotational speed, the detected value of $T_{min}$ is 11, and the detected value of $T_{max}$ is 31. Next, $T_{min}$ is input to the $T_{min}$ minimum value detector 4038 and the $T_{min}$ maximum value detector 4039. The $T_{min}$ minimum value detector 4038 detects a minimum value of $T_{min}$ in every second period and outputs the value. The $T_{min}$ maximum value detector 4039 detects a maximum value of $T_{min}$ in every second period and outputs the value.

On the other hand, $T_{max}$ is input to the $T_{max}$ minimum value detector 40310. The $T_{max}$ minimum value detector 40310 detects a minimum value of $T_{max}$ in every second period and outputs the value. The first period is as long as a period of two frames, and the second period is four times as long as the first period. Therefore, there are four $T_{min}$ data and four $T_{max}$ data which are detected in the first period within the second period.

A description is given of the operation of the disk rotation control circuit 503. The disk rotation control circuit 503 outputs a disk rotation control signal in response to the rotational information signal and an error detecting signal from the rotational information detecting circuit 403. Reference numeral 5031 designates a signal selector for selecting a signal in response to a tracking operation control signal TRON. This signal TRON is a TTL (transistor-transistor logic) level signal that is "Low" during the tracking operation and "High" when the tracking operation is not performed. The signal selector 5031 selects $TS_{min}$ output from the $T_{min}$ minimum value detector 4038 during the tracking operation and selects $TL_{min}$ output from the $T_{min}$ maximum value detector 4039 when the tracking operation is not performed. An output from the signal selector 5031 is input to a $T_{min}$ target value setting circuit 5033. The $T_{min}$ target value setting circuit 5033 subtracts the target value of the $T_{min}$ control, 11, from the signal output from the signal selector 5031 and inputs the result of the subtraction to one of two inputs of a signal selector 5032. A $T_{max}$ target value setting circuit 5034 subtracts the target value of the $T_{max}$ control, 31, from $TS_{max}$ output from the $T_{max}$ minimum value detector 40310 and inputs the result of the subtraction to the other input of the signal selector 5032. The signal selector 5032 selects one of the $T_{min}$ control and the $T_{max}$ control in response to a min/max signal and outputs a rotation control signal RCS.

Receiving the rotation control signal RCS, the motor driving circuit 6 drives the spindle motor 7 in response to the signal RCS.

The operation of the disk rotation control apparatus so constructed will be described in more detail using FIGS. 6 and 7. Initially, the rotation control circuit 503 applies a disk rotation control signal through the driving circuit 6 to the spindle motor 7. The spindle motor 7 rotates at a prescribed rotational speed in response to the rotation control signal. In this state, the light beam 3 emitted from the optical pick-up 2 irradiates the optical disk 1. A focus servo system (not shown) controls the optical pick-up 2 so that the light beam 3 emitted from the pick-up 2 is accurately focused on the information recording surface of the optical disk 1. While the focus servo control is performed, a tracking servo system (not shown) controls the optical pick-up 2 so that the light beam 3 follows a track on the optical disk 1. In this way, the information recorded on the optical disk 1 is read from the reproduced RF signal.

Then, the rotational information detecting circuit 403 digitizes the reproduced RF signal in an appropriate slice level to produce an RF pulse signal. Then, the rotational information detecting circuit 403 counts a pulse width (edge-to-edge interval) of the RF pulse signal at a clock having a frequency twice as high as that of the reproduction reference clock XCK to obtain a counted value $T_{min}$ of the minimum time length of the reproduced signal and a counted value $T_{max}$ of the maximum time length of the reproduced signal, in every first period. Further, the rotational information detecting circuit 403 detects a minimum value of $T_{min}$, a maximum value of $T_{min}$, and a minimum value of $T_{max}$, in every second period, and outputs these values as a rotational information signal.

The rotational information signal is input to the rotation control circuit 503. When the tracking control is OFF, the rotation control circuit 503 selects the maximum value of $T_{min}$ as rotational information. When the tracking control is ON, it selects the minimum value of $T_{min}$ as rotational information. Since the target value of $T_{min}$ is 11 as described above, when servo control on the basis of $T_{min}$ is performed, the target value of $T_{min}$, 11, is subtracted from the rotational information signal, and the rotation of the disk is controlled so that the difference between them is always zero.

After the tracking control is turned ON, the rotation control circuit 503 selects the minimum value of $T_{max}$ as rotational information, for the reason mentioned later. Since the target value of $T_{max}$ is 31 as described above, when servo control on the basis of $T_{max}$ is performed, the target value of $T_{max}$, 31, is subtracted from the rotational information signal, and the rotation of the disk is controlled so that the difference between them is always zero. The signal from which the rotational target value is subtracted is output from the rotation control circuit 503 as a rotation control signal and input to the driving circuit 6. The driving circuit 6 drives the spindle motor 7 in response to the rotation control signal.

A description is now given of the reason why the minimum value of $T_{min}$ is selected when the tracking control is ON and the maximum value of $T_{min}$ is selected when the tracking control is OFF. When the tracking control is performed, the reproduction signal RF has a waveform of constant amplitude. However, when the tracking control is OFF, the amplitude of the reproduction signal RF becomes small when the light beam crosses the track. In other words, the light beam's crossing the track causes an omission in the reproduction signal. The omission in the reproduction signal sometimes causes false detection of $T_{min}$ in the first period. The false detection has a tendency to detect a value smaller than a $T_{min}$ value to be detected correctly. Therefore, when a minimum value of $T_{min}$ is detected in the second period, incorrect data of $T_{min}$ are output during the second period. If the rotation of the disk is controlled according to the incorrect value smaller than the correct $T_{min}$ to be detected in the second period, the servo system recognizes that the rotational speed of the disk is higher than the actual rotational speed and decreases the rotational speed of the disk. If the incorrect detection continues, the rotation of the disk is completely stopped. In order to avoid this problem, when the tracking control is OFF, the maximum value of $T_{min}$ is selected in the second period, so that the $T_{min}$ value detected in the second period is proximate to the correct $T_{min}$ value as long as incorrect data are not continuously detected in the second period.

As described above, when the tracking control is OFF, malfunction of the disk rotation control apparatus is avoided by controlling the rotation of the spindle motor 7 according to the maximum value of $T_{min}$.

On the other hand, in the tracking control ON state, when the rotation of the disk is controlled according to the maximum value of $T_{min}$, if a defect occurs in the disk 1, an incorrect value larger than the $T_{min}$ value to be detected is sometimes detected. In this case, when a maximum value of $T_{min}$ is detected in the second period, incorrect data of $T_{min}$ are output during the second period. If the rotation of the disk is controlled according to the incorrect value larger than the correct value of $T_{min}$ to be detected in the second period, the servo system recognizes that the rotational speed of the disk is lower than the actual rotational speed and increases the rotational speed of the disk. If this false detection continues, unwanted runaway operation of the disk rotation control apparatus occurs. In order to avoid this problem, when the tracking control is ON, the minimum value of $T_{min}$ is selected in the second period, so that the $T_{min}$ value detected in the second period is proximate to the correct $T_{min}$ value as long as a defect longer than the second period is not present in the disk.

As described above, when the tracking control is ON, malfunction of the disk rotation control apparatus is avoided by controlling the rotation of the spindle motor 7 according to the minimum value of $T_{min}$.

[Embodiment 4]

Figure 8:
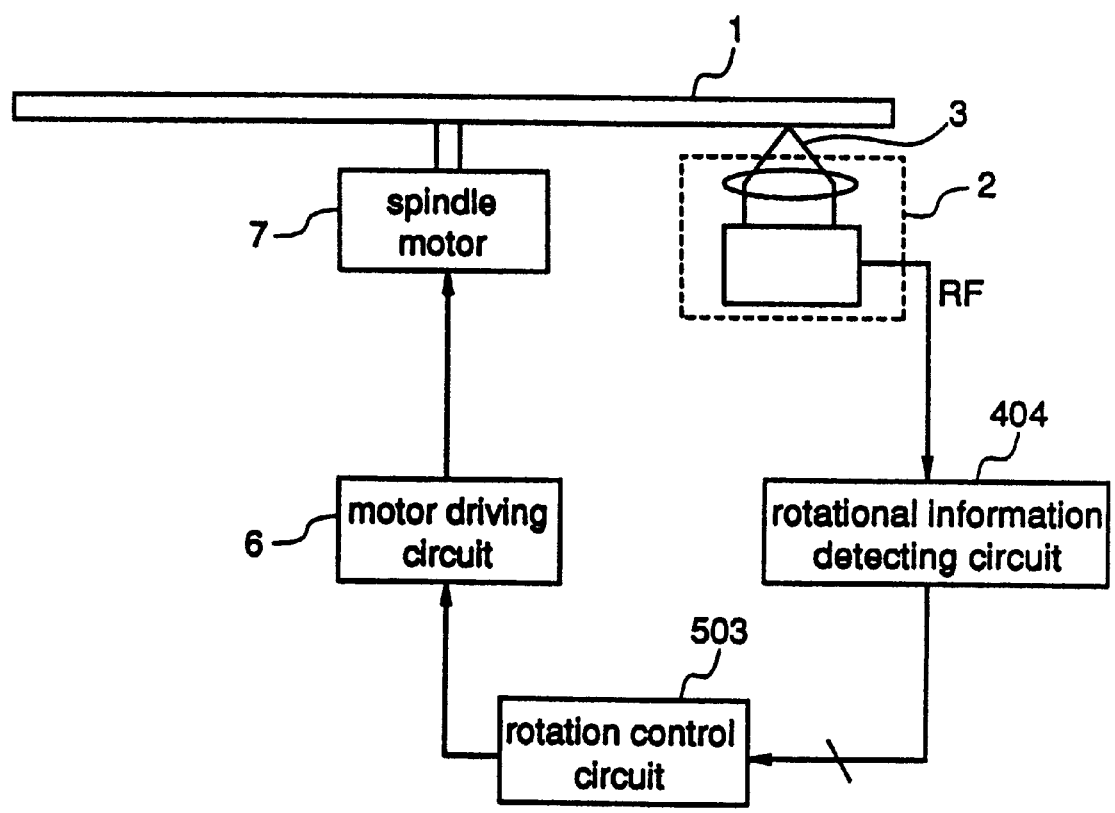
FIG. 8 is a block diagram illustrating a disk rotation control apparatus in accordance with a fourth embodiment of the invention.

FIG. 8 is a block diagram illustrating a disk rotation control apparatus in accordance with a fourth embodiment of the present invention. In FIG. 8, the same reference numerals as those shown in FIG. 1 designate the same or corresponding parts. Reference numeral 404 designates a rotational information detecting circuit that judges whether the rotational information detected in the first period is deviated by a prescribed value from the rotational information detected in the second period. According to the result of the judgment, the rotational information detecting circuit 404 outputs the present rotational information or rejects the present information and outputs the rotational information detected previously.

Figure 9:
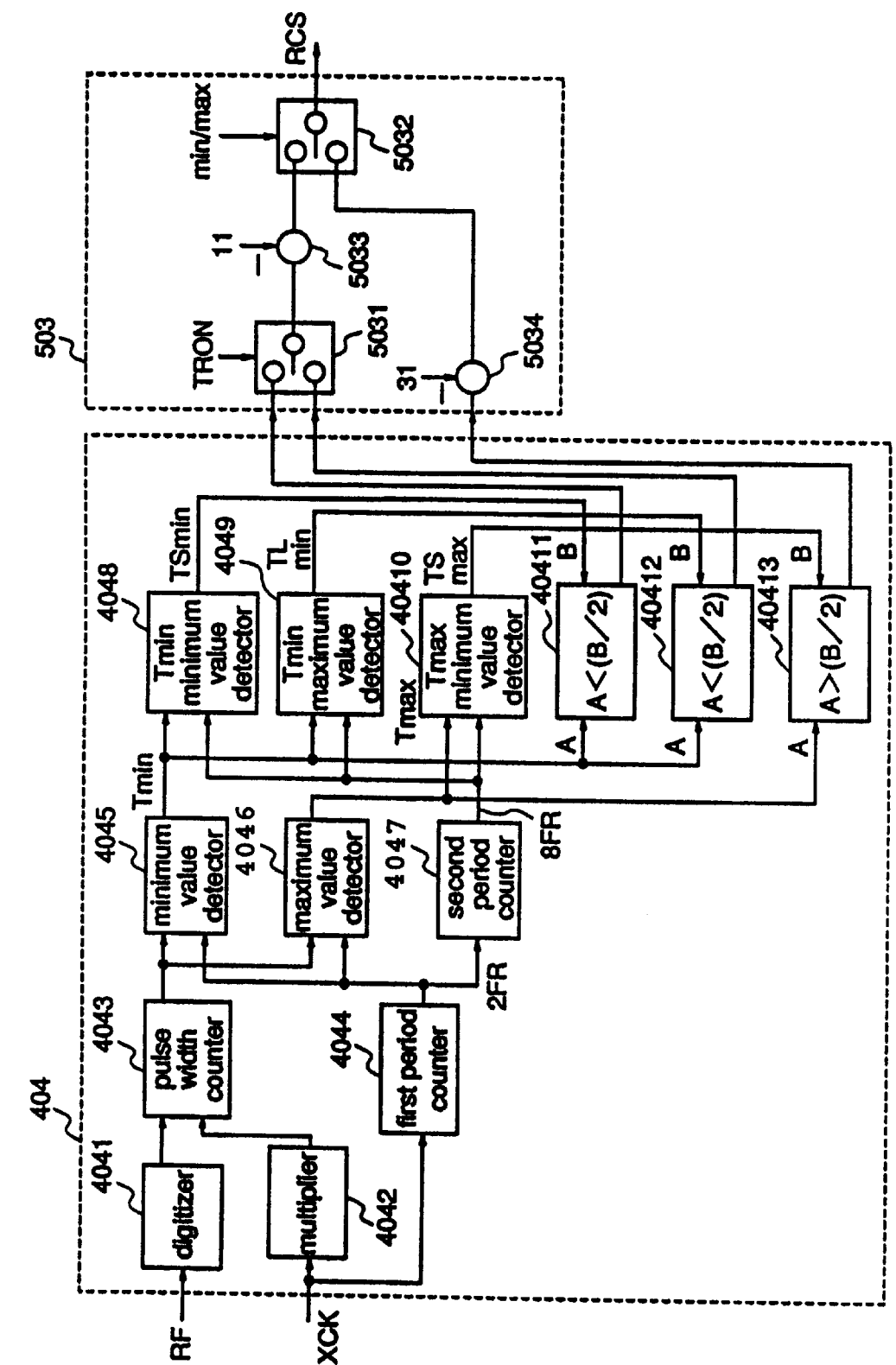
FIG. 9 is a block diagram illustrating, in detail, a rotational information detecting circuit and a rotation control circuit which are constituents of the disk rotation control apparatus shown in FIG. 8.

FIG. 9 is a block diagram illustrating the rotational information detecting circuit 404 in more detail.

Hereinafter, the operation of the rotational information detecting circuit 404 will be described using FIG. 9.

The rotational information detecting circuit 404 according to this fourth embodiment is different from the rotational information detecting circuit 403 according to the third embodiment only in that a $T_{min}$ rejecting circuit 40411, a $T_{min}$ rejecting circuit 40412, and a $T_{max}$ rejecting circuit 40413 are added. The $T_{min}$ rejecting circuit 40411 compares a one-period previous output $TS_{min}$ from the $T_{min}$ minimum value detector 4048 on the basis of the second period, with a $T_{min}$ output from the minimum value detector 4045. When $T_{min}$ is smaller than $1/2 \cdot TS_{min}$, one-period previous $T_{min}$ on the basis of the first period is input to the $T_{min}$ minimum value detector 4048. When $T_{min}$ is equal to or larger than $1/2 \cdot TS_{min}$, $T_{min}$ detected in the first period is directly input to the $T_{min}$ minimum value detector 4048. That is, when $T_{min}$ is smaller than $1/2 \cdot TS_{min}$, the $T_{min}$ value is rejected and replaced with one-period previous $T_{min}$ detected in the first period. When the case where $T_{min}$ is smaller than $1/2 \cdot TS_{min}$ continues for two times, it is replaced with two-period previous $T_{min}$ detected in the first period. Therefore, when the case where $T_{min}$ is smaller than $1/2 \cdot TS_{min}$ continues for N times, it is replaced with N-period previous $T_{min}$ detected in the first period. The value of N is smaller than N when the second period is N times as long as-the first period.

The $T_{min}$ rejecting circuit 40412 compares one-period previous output $TL_{min}$ from the $T_{min}$ maximum value detector 4049 on the basis of the second period, with $T_{min}$ output from the minimum value detector 4045. When $T_{min}$ is smaller than $1/2 \cdot TL_{min}$, one-period previous $T_{min}$ on the basis of the first period is input to the $T_{min}$ maximum value detector 4049. When $T_{min}$ is equal to or larger than $1/2 \cdot TL_{min}$, $T_{min}$ detected in the first period is directly input to the $T_{min}$ maximum value detector 4049. That is, when $T_{min}$ is smaller than $1/2 \cdot TL_{min}$, the $T_{min}$ value is rejected and replaced with one-period previous $T_{min}$ detected in the first period. When the case where $T_{min}$ is smaller than $1/2 \cdot TL_{min}$ continues for two times, it is replaced with two-period previous $T_{min}$ detected in the first period. Therefore, when the case where $T_{min}$ is smaller than $1/2 \cdot TL_{min}$ continues for N times, it is replaced with N-period previous $T_{min}$ detected in the first period. The value of N is smaller than N when the second period is N times as long as the first period.

The $T_{max}$ rejecting circuit 40413 compares one-period previous output $TS_{max}$ from the $T_{max}$ minimum value detector 40410 on the basis of the second period, with $T_{max}$ output from the maximum value detector 4046. When $T_{max}$ is larger than $2 \cdot TS_{max}$, one-period previous $T_{max}$ on the basis of the first period is input to the $T_{max}$ minimum value detector 4049. When $T_{min}$ is equal to or smaller than $2 \cdot TS_{max}$, $T_{max}$ detected in the first period is directly input to the $T_{max}$ minimum value detector 40410. That is, when $T_{max}$ is larger than $2 \cdot TS_{max}$, the $T_{max}$ value is rejected and replaced with one-period previous $T_{max}$ detected in the first period. When the case where $T_{max}$ is larger than $2 \cdot TS_{max}$ continues for two times, it is replaced with two-period previous $T_{max}$ detected in the first period. Therefore, when the case where $T_{max}$ is larger than $2 \cdot TS_{max}$ continues for N times, it is replaced with N-period previous $T_{max}$ detected in the first period. The value of N is smaller than N when the second period is N times as long as the first period.

After the above-mentioned process steps to the rotational information obtained from the RF signal reproduced by the optical pick-up 2, an output from the rotational information detecting circuit 404 is input to the rotation control circuit 503.

As described above, according to the fourth embodiment of the invention, when the rotational information detected in the first period is deviated by a prescribed value from the rotational information detected in the second period, this rotational information is rejected, and one-period previous rotational information detected in the first period is employed as rotational information to control the rotation of the disk. Therefore, disturbance in the rotation control due to false detection of rotational information is reduced, whereby the rotation control is normally performed.

[Embodiment 5]

Figure 10:
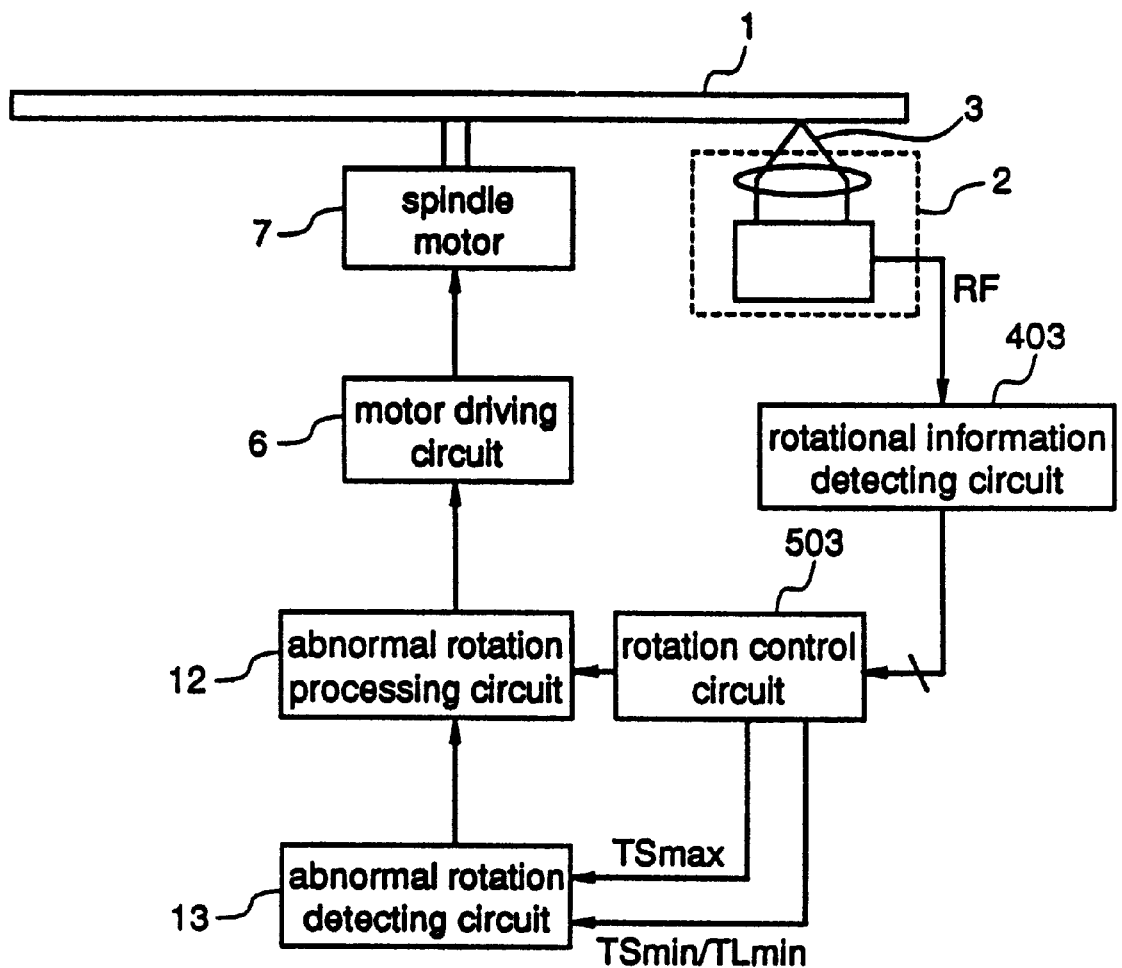
FIG. 10 is a block diagram illustrating a disk rotation control apparatus in accordance with a fifth embodiment of the invention.

FIG. 10 is a block diagram illustrating a disk rotation control apparatus in accordance with a fifth embodiment of the present invention. The apparatus according to this fifth embodiment is fundamentally identical to the apparatus according to the third embodiment except that an abnormal rotation detecting circuit 13 and an abnormality processing circuit 12 are added.

Initially, the abnormal rotation detecting circuit 13 will be described. The abnormal rotation detecting circuit 13 detects that the rotation of the disk is abnormal, on the basis of the rotational information from the rotational information detecting circuit 403. More specifically, when the tracking control is OFF, the ratio of the $T_{min}$ maximum value detecting signal $TL_{min}$ to the $T_{max}$ minimum value detecting signal $TS_{max}$ is obtained. When the tracking control is ON, the ratio of the $T_{min}$ minimum value detecting signal $TS_{min}$ to the $T_{max}$ minimum value detecting signal $TS_{max}$ is obtained. When the rotational speed is controlled and the target rotational speed is reached, $TL_{min}$ and $TS_{min}$ are 11, and $TS_{max}$ is 31. So, the ratio of $TL_{min}$ ($TS_{min}$) to $TS_{max}$ is 1:2.82.

That is, $TS_{max}$ is 2.82 times as large as $TL_{min}$ ($TS_{min}$). This ratio can be easily obtained by division using a conventional divider or a DSP (digital signal processor). When this ratio is not within a prescribed range, for example, a range from 1.88 to 4.23 for 2.82 in the normal state where the disk rotates at the target rotational speed, the abnormal rotation detecting circuit 13 judges that the rotation is abnormal and outputs an abnormality detecting signal to the abnormality processing circuit 12. The abnormality detecting signal is a TTL level signal which is "0" in the normal state and "1" in the abnormal state.

Next, the-abnormality processing circuit 12 will be described. Receiving the abnormality detecting signal from the abnormal rotation detecting circuit 13, the abnormality processing circuit 12 controls the rotation of the disk in the abnormal state. When the rotation control signal from the disk rotation control circuit 503 is input to the abnormality processing circuit 12 and the abnormality detecting signal is "0", i.e., when the rotation control is normal, the abnormality processing circuit 12 outputs the control signal as it is to the motor driving circuit 6. When the abnormality detecting signal is "1", i.e., when the rotation control is abnormal, the abnormality processing circuit 12 outputs an abnormality processing signal toward the motor driving circuit 6 and performs an appropriate processing for the abnormal rotation. This processing is, for example, to stop the rotation of the disk by suspending the rotation control according to the rotation control signal from the disk rotation control circuit 503.

As described above, according to the fifth embodiment of the invention, when the ratio of the minimum time length of the rotational information to the maximum time length thereof is not within a prescribed range, the abnormal rotation detecting circuit 13 judges that the rotation of the disk is abnormal and outputs an abnormality detecting signal, and the abnormality processing circuit 12 takes an appropriate countermeasure against the abnormal rotation, according to the abnormality detecting signal. Therefore, when the rotation of the disk is uncontrollable due to runaway operation of the rotation control system or unwanted stop of the disk 1, the abnormality processing circuit 12 can deal with the abnormal rotation promptly.

[Embodiment 6]

Figure 11:
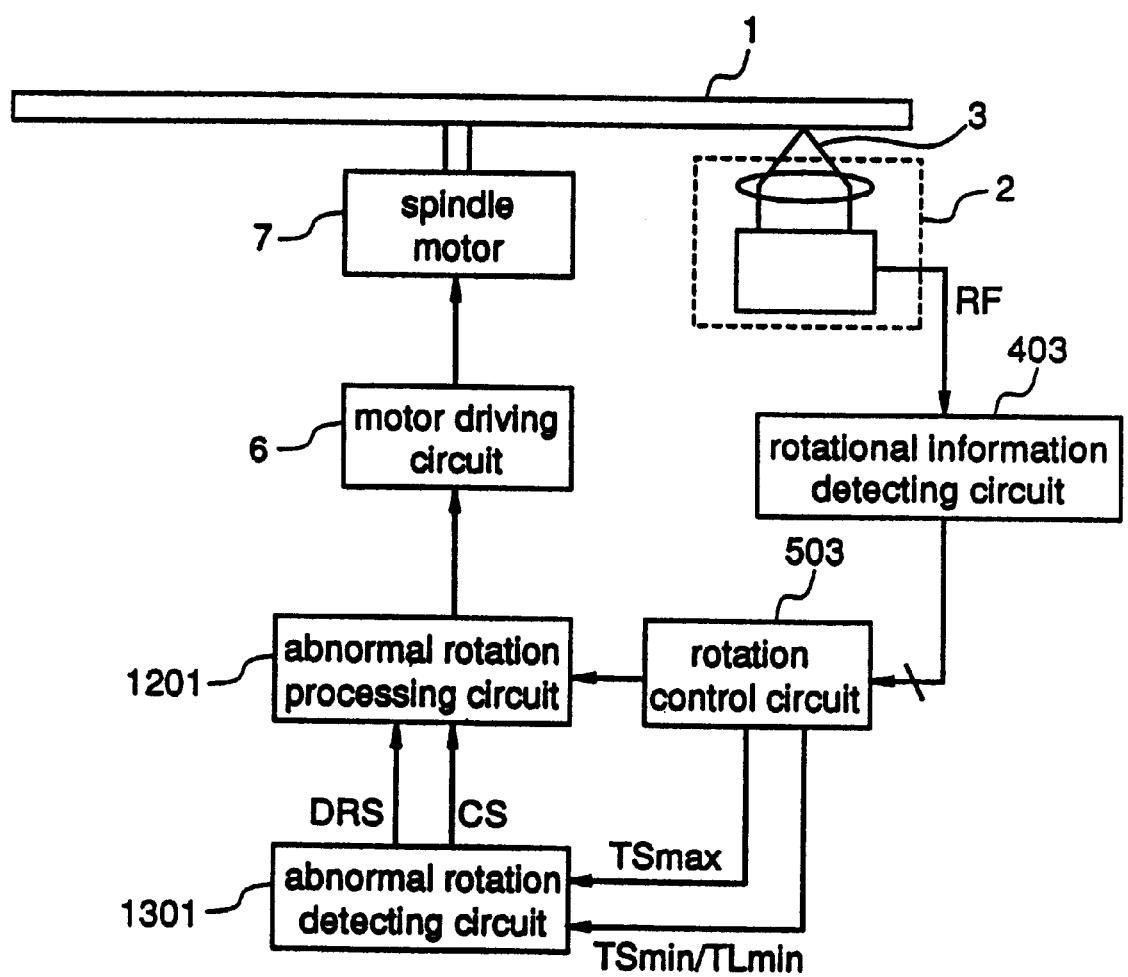
FIG. 11 is a block diagram illustrating a disk rotation control apparatus in accordance with a sixth embodiment of the invention.

FIG. 11 is a block diagram illustrating a disk rotation control apparatus in accordance with a sixth embodiment of the present invention. In FIG. 11, reference numeral 1301 designates an abnormal rotation detecting circuit. The abnormal rotation detecting circuit 1301 Judges that the rotation control is abnormal when the minimum time length or the maximum time length, which is detected by the rotational information detecting circuit 403, is out of a prescribed target range for a prescribed period of time, and also detects the direction of the abnormal rotation, i.e., whether the rotational information signal is larger than the target value of the rotation control or smaller than the target value. Reference numeral 1201 designates an abnormality processing circuit for controlling the abnormal rotation according to an abnormality detecting signal and an abnormality direction detecting signal from the abnormal rotation detecting circuit 1301.

Initially, the abnormal rotation detecting circuit 1301 will be described. The abnormal rotation detecting circuit 1301 detects that the rotation of the disk 1 is abnormal from the rotational information detected by the rotational information detecting circuit 403. When the tracking control is OFF, the abnormal rotation detecting circuit 1301 detects that the $T_{min}$ maximum value detecting signal $TL_{min}$ is out of a range from 7 to 16 while the target value on the basis of the minimum time length is 11, and judges that the rotation control is abnormal when the state where the $TL_{min}$ signal is out of the target range continues for a prescribed time, for example, 100 ms.

On the other hand, when the tracking control is ON, the abnormal rotation detecting circuit 1301 detects that the $T_{min}$ minimum value detecting signal $TS_{min}$ is out of a range from 7 to 16 while the target value on the basis of the minimum time length is 11, and judges that the rotation control is abnormal when the state where the $TS_{min}$ signal is out of the target range continues for a prescribed time, for example, 100 ms. Further, the abnormal rotation detecting circuit 1301 detects that the $T_{max}$ minimum value detecting signal $TS_{max}$ is out of a range from 21 to 47 while the target value on the basis of the maximum time length is 31, and judges that the rotation control is abnormal when the state where the $TS_{max}$ signal is out of the target range continues for a prescribed time, for example, 100 ms. Thereafter, the abnormal rotation detecting circuit 1301 outputs the result of the detection to the abnormality processing circuit 1201 as an abnormality detecting signal. The abnormality detecting signal is a TTL level signal that is "1" in the normal state and "0" in the abnormal state.

Further, the abnormal rotation detecting circuit 1301 detects the direction of the abnormality. That is, when the rotational information signal is larger than the target value of the rotation control, it is judged that the rotational speed of the disk is lower than the target rotational speed. When the rotational information signal is smaller than the target value of the rotation control, it is judged that the rotational speed of the disk is higher than the target rotational speed.

The direction of the abnormality so detected is input to the abnormality processing circuit 1201 as an abnormality direction detecting signal. The abnormality direction detecting signal is a TTL level signal that is "1" when the rotational speed of the disk is higher than the target speed and "0" when the rotational speed of the disk is lower than the target speed.

Next, the abnormality processing circuit 1201 will be described. Receiving the abnormality detecting signal and the abnormality direction detecting signal from the abnormal rotation detecting circuit 1301, the abnormality processing circuit 1201 controls the rotation of the disk in the abnormal state. When the rotation control signal from the disk rotation control circuit 503 is input to the abnormality processing circuit 1201 and the abnormality detecting signal is "0", i.e., when the rotation is normal, the abnormality processing circuit 1201 outputs the rotation control signal as it is to the motor driving circuit 6. When the abnormality detecting signal is "1", i.e., when the rotation is abnormal, the abnormality processing circuit 1201 outputs an abnormality processing signal, in place of the rotation control signal, to the motor driving circuit 6, and an appropriate processing for the abnormal rotation of the disk is performed.

The processing performed by the abnormality processing circuit 1201 is as follows. When the abnormality detecting signal is "1" and the abnormality direction detecting signal indicates that the rotational speed of the disk is higher than the target speed, the abnormality processing circuit 1201 applies a brake signal to the motor driving circuit 6 to stop the rotation of the disk 1. Thereby, runaway rotation of the disk is avoided and the rotation of the disk is stopped. When the abnormality direction detecting signal indicates that the rotational speed of the disk is lower than the target speed, the abnormality processing circuit 1201 stops the rotation of the disk 1. When the processing to control the abnormal rotation is performed, simultaneously with the stop of the rotation of the disk, other servo systems are turned off.

As described above, according to the sixth embodiment of the invention, the abnormal rotation detecting circuit 1301 judges that the rotation is abnormal when the minimum time length or the maximum time length, which is detected by the rotational information detecting circuit 403, is out of a prescribed target range for a prescribed period of time, and also detects the direction of the abnormality, that is, whether the rotational information signal is larger than the target value of the rotation control or smaller than the target value. The abnormality processing circuit 1201 controls the abnormal rotation of the disk according to the abnormality detecting signal and the abnormality direction detecting signal from the abnormal rotation detecting circuit 1301. Therefore, when the rotation of the disk is uncontrollable due to runaway operation of the rotation control system or unwanted stop of the disk 1, the abnormality processing circuit 1201 can deal with the abnormal rotation promptly.

[Embodiment 7]

Figure 12:
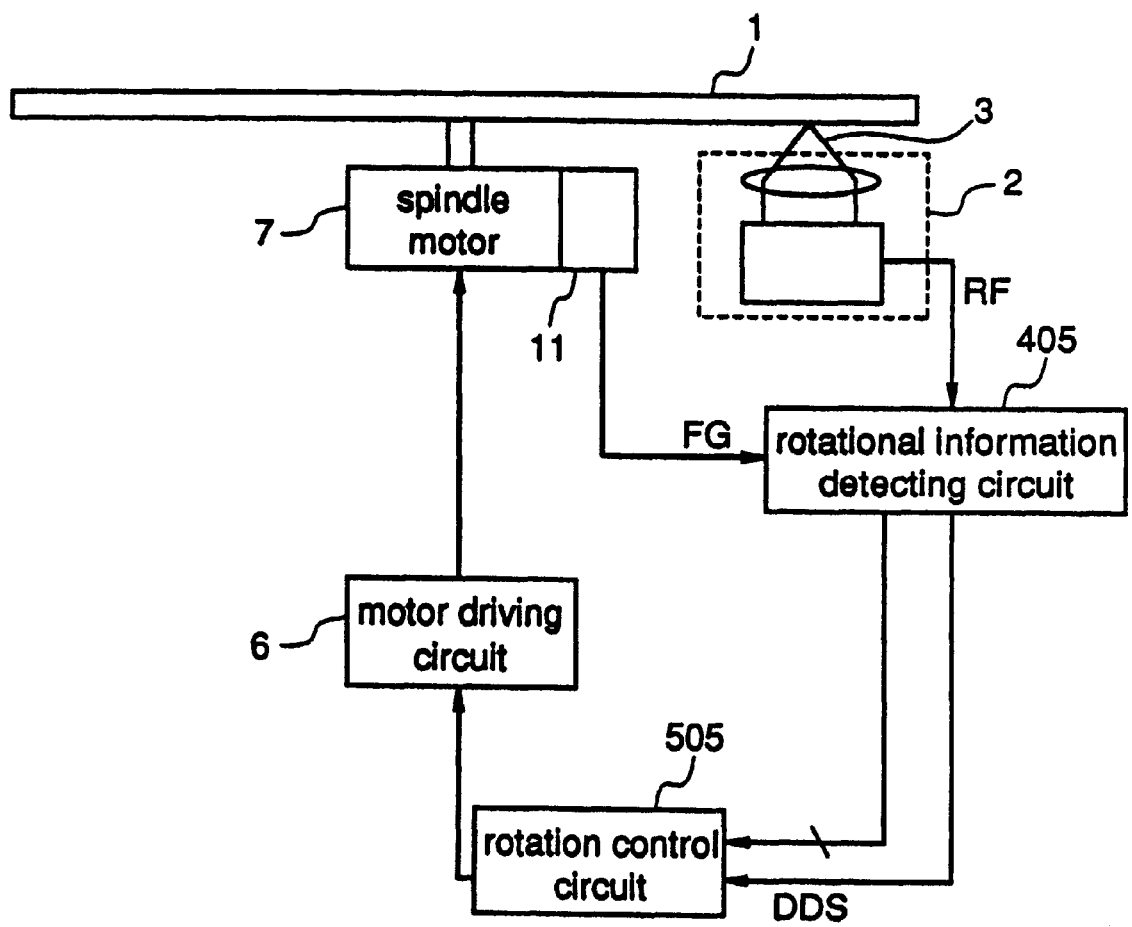
FIG. 12 is a block diagram illustrating a disk rotation control apparatus in accordance with a seventh embodiment of the invention.

FIG. 12 is a block diagram illustrating a disk rotation control apparatus in accordance with a seventh embodiment of the present invention. In FIG. 12, reference numeral 405 designates a rotational information detecting circuit that identifies the kind of the disk 1 on the basis of a pulse signal FG generated by the frequency generator 11 and a reproduction signal RF. Reference numeral 505 designates a rotation control circuit that changes the gain of the rotation control loop according to a disk discriminating signal DDS output from the rotational information detecting circuit 405. In this apparatus, a plurality of disks of different diameters or masses are discriminated from each other by the respective rise times at the start of the rotation.

The pulse signal FG output from the frequency generator 11 is input to the rotational information detecting circuit 405. The disk rotation control circuit 505 outputs a control signal for accelerating the rotational speed of the disk until the speed reaches a prescribed speed at the start of the disk rotation control, and drives the spindle motor 7 through the motor driving circuit 6. At the same time, the rotational information detecting circuit 405 measures the frequency of the pulse signal FG. Further, the rotational information detecting circuit 405 measures the time interval required for the frequency generator 11 to reach a prescribed frequency, i.e., to output an expected pulse signal, from the application of the acceleration signal to the spindle motor 7.

When a plurality of disks of the same kind are rotated by the same apparatus, the rise times of these disks, i.e., time intervals required to reach a prescribed rotational speed, are equal to each other. However, when a plurality of disks of different kinds, i.e., different masses or diameters, are compared with respect to the rise times, the rise times vary in proportion to the masses or diameters of the disks.

Hereinafter, the relationship between the rise time of a disk and the mass or the diameter of the disk will be described. When the mass is m, the radius is a, and the inertial moment of the disk is JD, the following relationship stands.

$$JD = m \times (a^2)/4 \quad (10)$$

According to formula (10), the mass m of the disk is in proportion to the inertial moment JD of the disk, and the square of the radius a, i.e., $a^2$, is in proportion to the inertial moment JD. Therefore, with an increase in the mass m or the radius a of the disk, the inertial moment JD of the disk increases.

Next, the transfer function G(S) of the dc motor is shown, and the relationship between the inertial moment J and the time constant τ (especially, the mechanical time constant τM) will be described. The transfer function G(S) of the dc motor is given by $$G(S) = (1/KE)/\{(S\tau E+1)(S\tau M+1)\} \quad (11)$$

where τE is the electrical time constant, and KE is the back electromotive force coefficient.

When the armature inductance is L, the armature resistance is R, the torque coefficient is KT, and the inertial moment of the rotor is JM, the following relationship stands.

$$L << JM \times R^2/(4\ KE\ KT) \quad (12)$$

So, the electrical time constant τE and the mechanical time constant τM are given by $$\tau E = L/R \quad (13)$$

$$\tau M = R \times JM/(KE \times KT) \quad (14)$$

Since the electrical time constant τE and the mechanical time constant τM have the relationship, τE<<τM, τM is dominant with respect to the rise time of the motor. FIG. 2(*a*) is a block diagram showing the simplified transfer function of the motor. FIG. 2(*b*) shows waveforms in response to step inputs to the motor. From FIGS. 2(*a*) and 2(*b*), the relationship between the time constant (τE or τM) and the time lag is obtained. Since the electrical time constant τE is smaller than the mechanical time constant τM as mentioned above, it is supposed from the step response waveforms shown in FIG. 2(*b*) that the response by the electrical time constant is faster than the response by the mechanical time constant.

As shown in formula (14), the mechanical time constant τM is in proportion to the inertial moment J, so that the mechanical time constant τM increases with an increase in the inertial moment J. In addition, the inertial moment J is given by $$J = JM + JL \quad (15)$$

where JM is the inertial moment of the motor and JL is the inertial moment of the load.

Assuming that the inertial moment JL of the load is approximately equal to the inertial moment JD of the disk, formula (15) is converted to $$J = JM + JD \quad (16)$$

When the disk 1 is changed for a disk of different mass m or different radius a, for example, when a 12 cm disk is changed for an 8 cm disk, the inertial moment JD of the disk changes. Since the inertial moment J changes with the change in the inertial moment JD, the mechanical time constant τM also changes. That is, when a 12 cm disk is changed for an 8 cm disk, the rise time of the motor changes. So, the rise time of the motor for the 12 cm disk is different from the rise time of the motor for the 8 cm disk.

A description is given of the operation of the disk rotation control apparatus according to this seventh embodiment at the disk discrimination.

Figure 13:
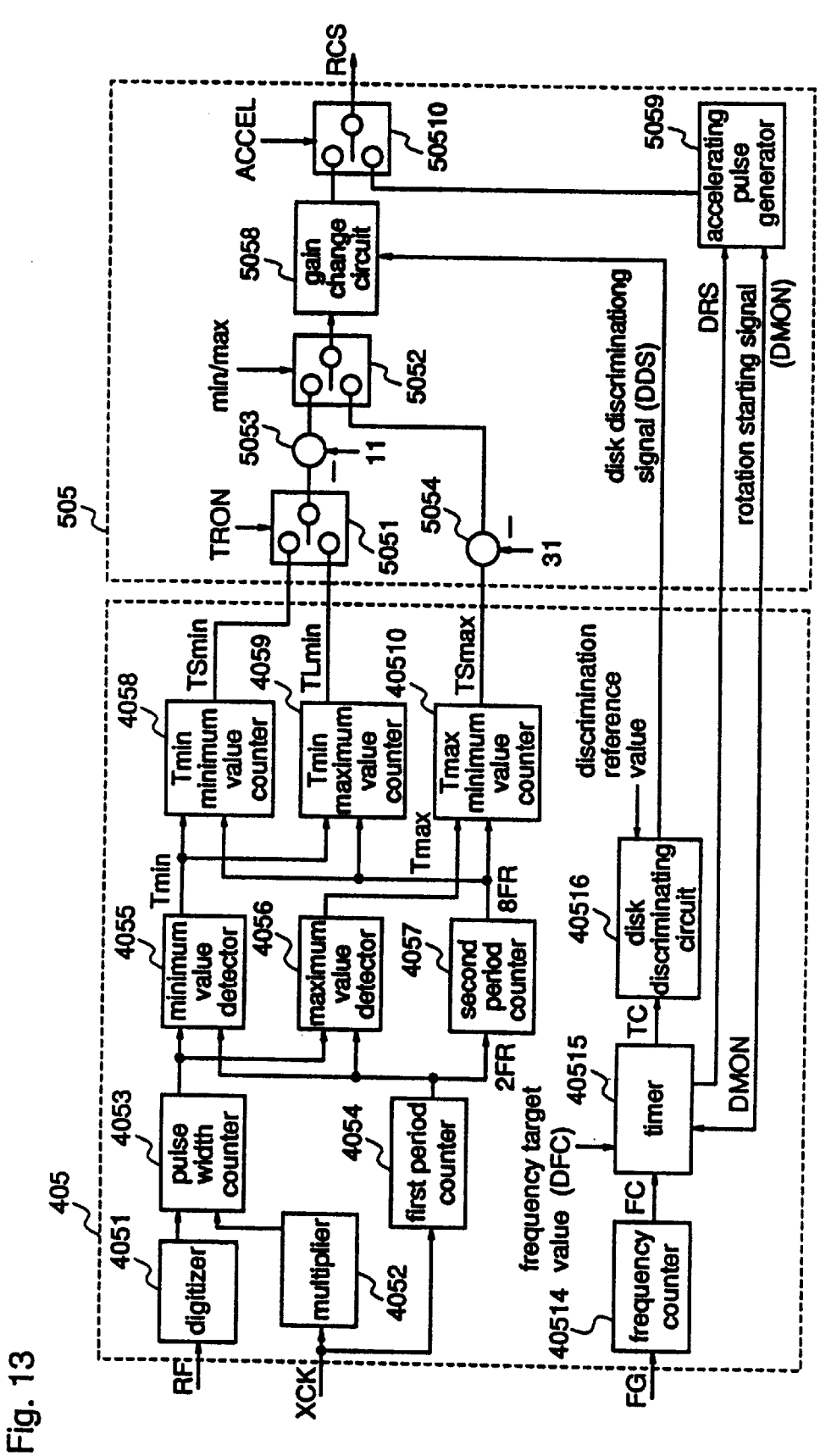
FIG. 13 is a block diagram illustrating, in detail, a rotational information detecting circuit and a rotation control circuit which are constituents of the disk rotation control apparatus shown in FIG. 12.

FIG. 13 is a block diagram illustrating the rotational information detecting circuit 405 and the rotation control circuit 505 in more detail. The structure of the rotational information detecting circuit 405 is fundamentally identical to the rotational information detecting circuit 403 according to the third embodiment except that a frequency counter 40514, a timer 40515, and a disk discriminating circuit 40516 are added. Other constituents are the same as those mentioned for the third embodiment. The structure of the disk rotation control circuit 505 is fundamentally identical to the disk rotation control circuit 503 according to the third embodiment except that a loop gain change means 5058, an acceleration pulse generator 5059, and a signal selector 50510 are added.

The frequency counter 40514 counts the frequency of the pulse signal FG from the frequency generator 11 and outputs the result as a frequency count value FC. The timer 40515 measures, according to a rotation start signal (DMON), a time required for the frequency count value FC to reach a target frequency value DFC from the start of the rotation of the disk, and outputs the result as a time count value TC. The disk discriminating circuit. 40516 compares the time count value TC with a disk discrimination reference value DL, discriminates the disk, and outputs the result of the discrimination as a disk discriminating signal DDS. The gain change circuit 5058 changes the gain of the rotation control loop in response to the disk discriminating signal DDS. The acceleration pulse generator 5059 outputs an acceleration pulse that accelerates the rotation of the disk at the start of the rotation. In response to a signal ACCEL that decides whether the rotational speed of the disk should be accelerated or not, the signal selector 50510 selects a signal from the acceleration pulse generator 5059 when the rotational speed should be accelerated and selects a signal from the gain change circuit in the usual state.

Therefore, when the apparatus is started, the disk rotation control circuit 505 outputs a control signal that accelerates the rotational speed of the disk until it reaches a prescribed rotational speed, and drives the spindle motor 7 through the motor drive circuit 6. When the spindle motor 7 rotates, the frequency generator 11 generates a signal FG of a frequency corresponding to the rotational frequency of the disk and outputs the signal FG to the frequency counter 40514. The frequency counter 40514 counts the frequency of the FG signal and outputs the frequency as a count value FC to the timer 40515. The timer 40515 starts to measure the time in response to a rotation start signal DMON from the disk rotation control circuit 505. The disk rotation control circuit 505 instructs the spindle motor 7 to accelerate until the count value FC from the frequency counter 40514 reaches the target frequency value DFC, through the motor driving circuit 6, to accelerate the rotation of the disk. The timer 40515 starts to measure the time in response to the rotation start signal DMON from the disk rotation control circuit 505. The rotation start signal DMON is a TTL level signal that is "High" when the rotation of the disk is under control and "Low" when the disk is stopped. So, the timer 40515 measures the time required for the frequency count value FC to reach the target frequency value DFC after the rotation start signal DMON becomes "High", and outputs the measured time, as a time count value TC, to the disk discriminating circuit 40516. The disk discriminating circuit 40516 compares the time count value TC with the discrimination reference value DL and outputs the result of the comparison as a disk discriminating signal DDS. The disk discriminating signal DDS is a TTL level signal. When the started disk is a 12 cm disk, the time count value TC is larger than the discrimination reference value DC, and the disk discriminating signal DDS is "Low" level. When the started disk is an 8 cm disk, the time count value TC is smaller than the discrimination reference value DC, and the disk discriminating signal DDS is "High" level. The disk rotation control circuit 505 changes the loop gain of the disk rotation control system according to the disk discriminating signal DDS. When it is assumed that the loop gain is adjusted so that the rotation control is stable in the normal state where the signal DDS is "Low", the rotation control circuit 505 reduces the loop gain when the signal DDS becomes "High". When the loop gain is reduced, it is reduced to a value at which rotation of an 8 cm disk is stably controlled.

As described above, according to the seventh embodiment of the present invention, the started disk is discriminated between a 12 cm disk and an 8 cm disk according to the rise time of the rotation control of the disk, and the gain of the rotation control loop is changed according to the result of the discrimination. Therefore, a stable rotation control is realized even when the kind of the disk varies.

The characteristics of the disk rotation control loop, for example, loop filter characteristics, may be changed to realize an optimum disk rotation control.

Further, the loop gain may be directly set in accordance with the rise time of the disk rotation control. That is, a reference loop gain for a reference rise time is decided in advance, and the rise time is used as a coefficient of the loop gain. That is, the loop gain is increased when the rise time is longer than the reference rise time, and the loop gain is reduced when the rise time is shorter than the reference rise time.

[Embodiment 8]

Figure 14:
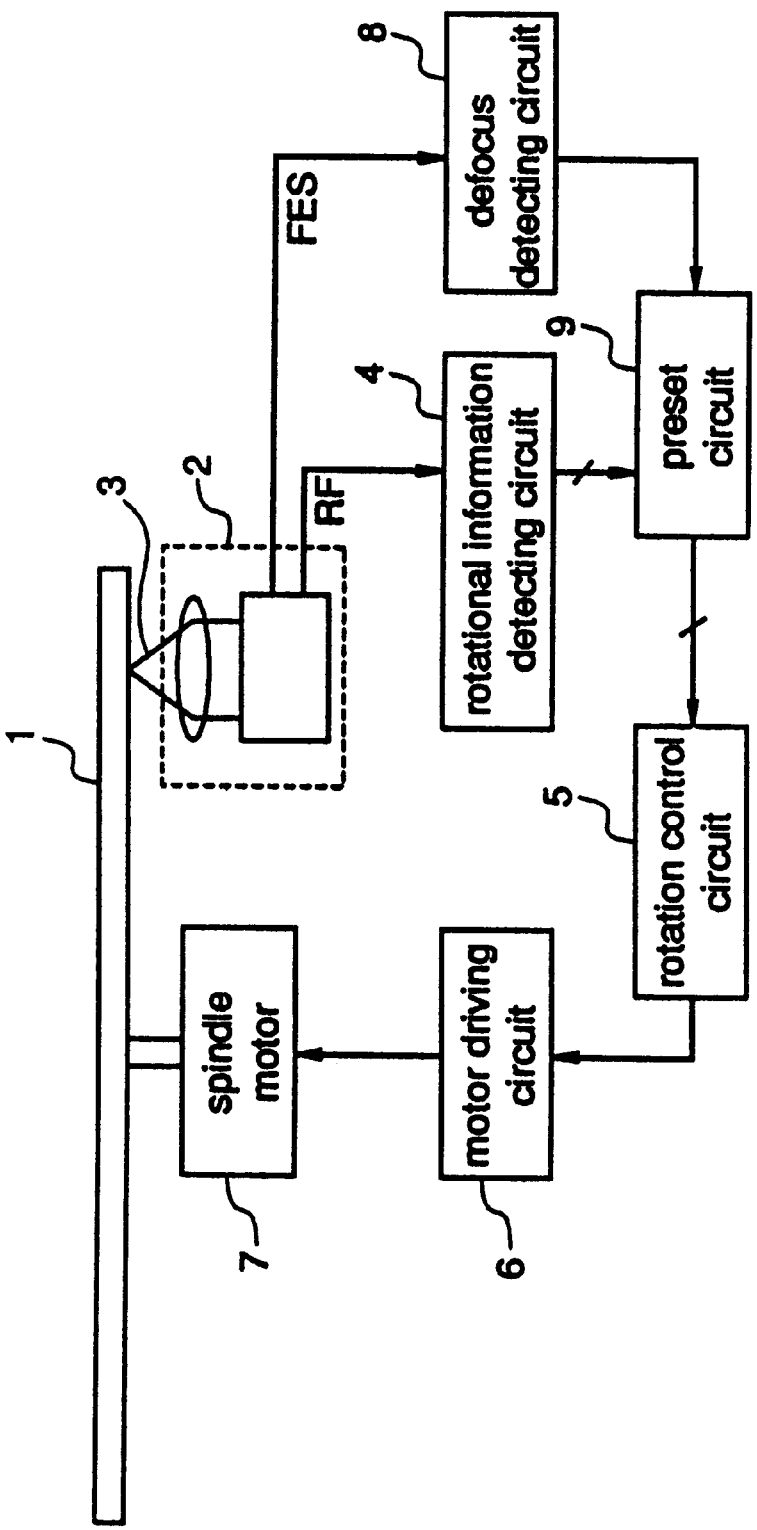
FIG. 14 is a block diagram illustrating a disk rotation control apparatus in accordance with an eighth embodiment of the invention.

FIG. 14 is a block diagram illustrating a disk rotation control apparatus in accordance with an eighth embodiment of the present invention. In FIG. 14, an optical disk 1 is mounted on a spindle motor 7. An optical pick-up 2 irradiates a disk 1 with a light beam 3 for reproducing information recorded on the disk 1, reproduces the information on the disk 1 from the light beam 3 reflected by the disk 1, and outputs a reproduction signal RF to the rotational information detecting circuit 4. The rotational information detecting circuit 4 detects rotational information of the disk from the reproduction signal RF. Reference numeral 5 designates a rotation control circuit, numeral 6 designates a motor driving circuit, numeral 8 designates a defocus detecting circuit, and numeral 9 designates a preset circuit.

Figure 15:
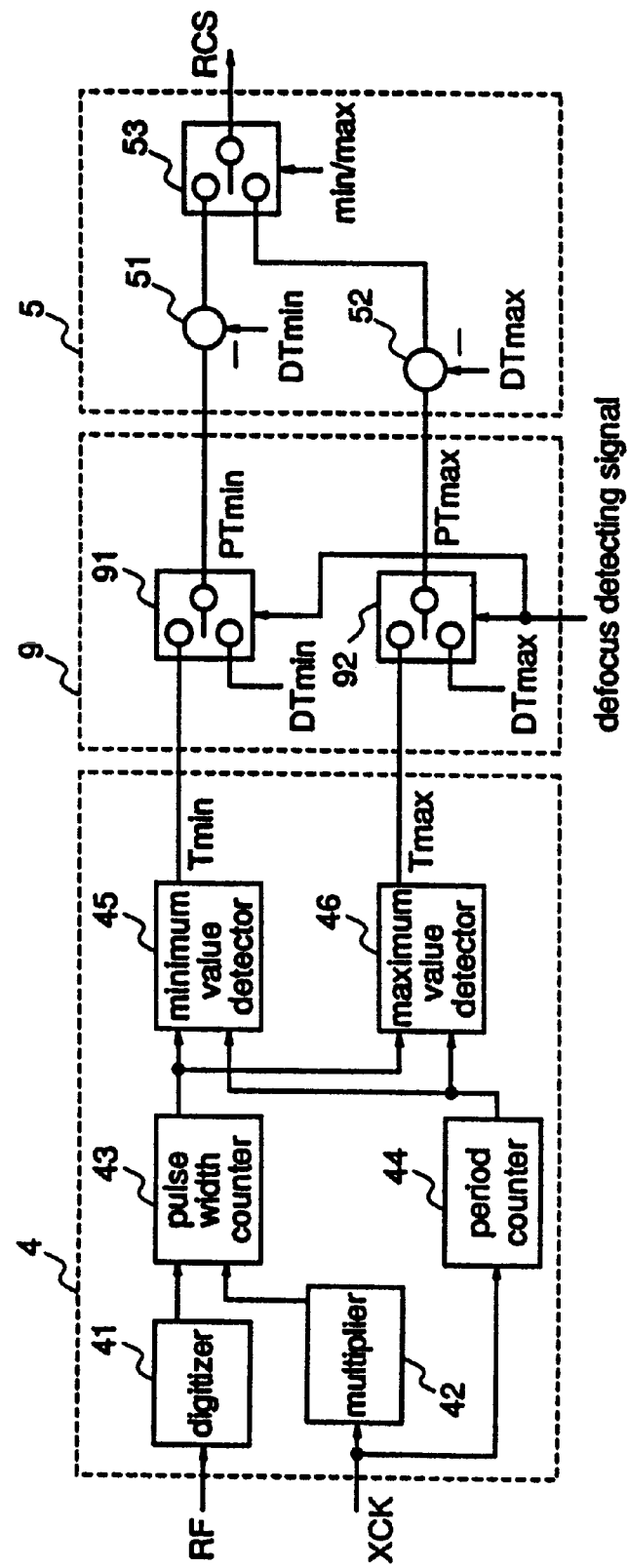
FIG. 15 is a block diagram illustrating, in detail, a rotational information detecting circuit, a preset circuit, and a rotation control circuit which are constituents of the disk rotation control apparatus shown in FIG. 14.

FIG. 15 is a block diagram illustrating the rotational information detecting circuit 4 and the rotation control circuit 5 in more detail. In FIG. 15, reference numeral 41 designates a digitizer. Reference numeral 42 designates a multiplier that outputs a signal having a frequency twice as high as that of an input signal. Reference numeral 43 designates a pulse width counter (TW counter) for counting the pulse width of the digitized RF signal. Reference numeral 44 designates a period counter. Reference numeral 45 designates a detector for detecting a minimum value ($T_{min}$) of an output from the TW counter 43 within a prescribed period. Reference numeral 46 designates a detector for detecting a maximum value ($T_{max}$) of an output from the TW counter 43 within the prescribed period.

The operation of the rotational information detecting circuit 4 will be described.

Initially, an RF signal reproduced by the optical pick-up 2 is input to the digitizer 41, wherein the RF signal is converted to an RF pulse signal digitized with a prescribed threshold. When the rotational speed of the disk 1 is fixed, the RF pulse signal has a pulse width that changes within a given range dependent on the modulation rule of data recorded in the disk 1, and the same $T_{min}$ and the same $T_{max}$ are obtained within a given period. Therefore, the minimum value detector 45 detects a minimum value $T_{min}$ of the time length of the RF pulse signal within the given period, and the maximum value detector 46 detects a maximum value $T_{max}$ of the time length of the RF pulse signal. As described above, the minimum value $T_{min}$ and the maximum value $T_{max}$ are always fixed values, respectively, as long as the rotational speed of the disk is fixed. As an example of the modulation rule, 8–15 modulation is employed. In this case, the minimum recorded data is as long as three periods of the reproduction clock (3T), and the maximum recorded data is as long as sixteen periods of the reproduction clock (16T). The minimum time length is equal to a series of minimum recorded data 3T and, in this eighth embodiment, it is 6T (3T×2). The maximum time length is equal to the maximum recorded data 16T. The multiplexer 42 generates a clock 2XCK having a frequency twice as high as that of the reproduction reference clock XCK. When the pulse width of the RF pulse signal is counted with the clock 2XCK, rotational information TW is obtained. This rotational information TW is input to the minimum value detector 45. and the maximum value detector 46. The minimum value detector 45 detects a minimum value of TW in every given period and outputs the value as $T_{min}$. The maximum value detector 46 detects a maximum value of TW in every given period and outputs the value as $T_{max}$. If it is assumed that the rotational speed of the disk is the target rotational speed, the detected value of $T_{min}$ is 11, and the detected value of $T_{max}$ is 31. The period during which $T_{min}$ and $T_{max}$ are detected is as long as a period of two frames.

The defocus detecting circuit 8 detects that the light beam 3 from the optical pick-up 2 is defocused (hereinafter referred to simply as defocus) when a focus error signal FES from the optical pick-up 2 is out of and larger than a prescribed range, and outputs a TTL level signal that is "High" when defocus is detected and "Low" when the signal FES is within the prescribed range.

The preset circuit 9 receives a rotational information signal from the rotational information detecting circuit 4 and a defocus detecting signal from the defocus detecting circuit 8. According to the defocus detecting signal, the preset circuit 9 outputs the rotational information signal as it is when defocus is not detected, and outputs a $T_{min}$ control target value and a $T_{max}$ control target value when defocus is detected.

A description is given of the operation of the rotation control circuit 5. The rotation control circuit 5 outputs a disk rotation control signal in accordance with the rotational information signal or the preset rotation control target value from the preset circuit 9. A $TP_{min}$ signal from the preset circuit 9 is input to a $T_{min}$ target value setting circuit 51. The $T_{min}$ target value setting circuit 51 subtracts the $T_{min}$ control target value, 11, from the $TP_{min}$ signal and outputs the result of the subtraction to one of two input terminals of a signal selector 53. Further, the $TP_{min}$ signal from the preset circuit 9 is input to a $T_{max}$ target value setting circuit 52. The $T_{max}$ target value setting circuit 52 subtracts the $T_{max}$ control target value, 31, from the $TP_{max}$ signal and outputs the result of the subtraction to the other input terminal of the signal selector 53. The signal selector 53 selects one of the $T_{min}$ control and the $T_{max}$ control in accordance with a min/max signal and outputs the result of the selection as a rotation control signal RCS.

The driving circuit 6 rotates the spindle motor 7 according to the rotation control signal RCS.

A description is given of the operation of the disk rotation control apparatus in more detail using FIGS. 14 and 15.

Initially, the disk rotation control circuit 5 applies a disk rotation control signal through the driving circuit 6 to the spindle motor 7. The spindle motor 7 rotates at a prescribed rotational speed in response to the rotation control signal. In this state, the light beam 3 emitted from the optical pick-up 2 irradiates the optical disk 1. A focus servo system (not shown) controls the optical pick-up 2 so that the light beam 3 emitted from the pick-up 2 is accurately focused on the information recording surface of the optical disk 1. While the focus servo control is performed, a tracking servo system (not shown) controls the optical pick-up 2 so that the light beam 3 follows a track on the optical disk 1. In this way, the information recorded on the optical disk 1 is read from the reproduced RF signal.

Next, the rotational information detecting circuit 4 digitizes the reproduced RF signal in an appropriate slice level to produce an RF pulse signal. Then, the rotational information detecting circuit 4 counts a pulse width (edge-to-edge interval) of the RF pulse signal at a clock having a frequency twice as high as that of the reproduction reference clock XCK to obtain a counted value $T_{min}$ of the minimum time length of the reproduced signal and a counted value $T_{max}$ of the maximum time length of the reproduced signal, in every given period. The rotational information detecting circuit 4 outputs these values as a rotational information signal.

The defocus detecting circuit 8 outputs a defocus detecting signal in response to a focus error signal FES from the optical head. The rotational information signal from the rotational information detecting circuit 4 is input to the preset circuit 9. The preset circuit 9 outputs the rotational information signal as it is when defocus is not detected but outputs a rotation control target value when defocus is detected, according to the defocus detecting signal. The output from the preset circuit 9 is input to the rotation control circuit 5.

Since the target value of $T_{min}$ is 11 as described above, when servo control on the basis of $T_{min}$ is performed, the target value of $T_{min}$, 11, is subtracted from the rotational information signal, and the rotation of the disk is controlled so that the difference between them is always zero. On the other hand, since the target value of $T_{max}$ is 31, when servo control on the basis of $T_{max}$ is performed, the target value of $T_{max}$, 31, is subtracted from the rotational information signal, and the rotation of the disk is controlled so that the difference between them is always zero. More specifically, the rotation control circuit 5 subtracts the $T_{min}$ control target value from the $PT_{min}$ signal output from the preset circuit 9, and inputs the result of the subtraction to one of the two input terminals of the signal selector 53. Further, the rotation control circuit 5 subtracts the $T_{max}$ control target value from the $PT_{max}$ signal, and inputs the result of the subtraction to the other input terminal of the signal selector 53. Therefore, the signal selector 53 outputs a rotation control signal RCS from which the rotation control target value is subtracted.

The rotation control signal RCS is input to the driving circuit 6. The driving circuit 6 rotates the spindle motor 7 in response to the rotation control signal.

When defocus is detected, the rotational information signal is made equal to the rotation control target value according to the defocus detecting signal. Hereinafter, this operation will be described in more detail. When focus control and tracking control are performed, the reproduced signal has a waveform of a constant amplitude. However, when the focus servo is moved due to disturbance applied to the apparatus and the light beam 3 is defocused, the quality of the reproduced signal is degraded.

When the quality of the reproduced signal is degraded, false detection of the rotational information signal increases. In order to solve this problem, the rotational information signal is made equal to the rotation control target value, according to the defocus detecting signal. Thereby, the rotation control residual is made zero, and the rotation control circuit does not increase and decrease the rotational speed when defocus is detected. Therefore, when the rotation of the disk is controlled by $T_{min}$, since the false detection of a $T_{min}$ value shorter than the correct $T_{min}$ value is avoided, the rotation control circuit does not recognize that the rotational speed of the disk should be decreased because it is higher than the target speed, so that unwanted stop of the disk is avoided. On the other hand, when the rotation of the disk is controlled by $T_{max}$, since the false detection of a $T_{max}$ value longer than the correct $T_{max}$ value is avoided, the rotation control circuit does not recognize that the rotational speed of the disk should be increased because it is lower than the target speed, so that unwanted runaway operation of the disk rotation control system is avoided.

[Embodiment 9]

Figure 16:
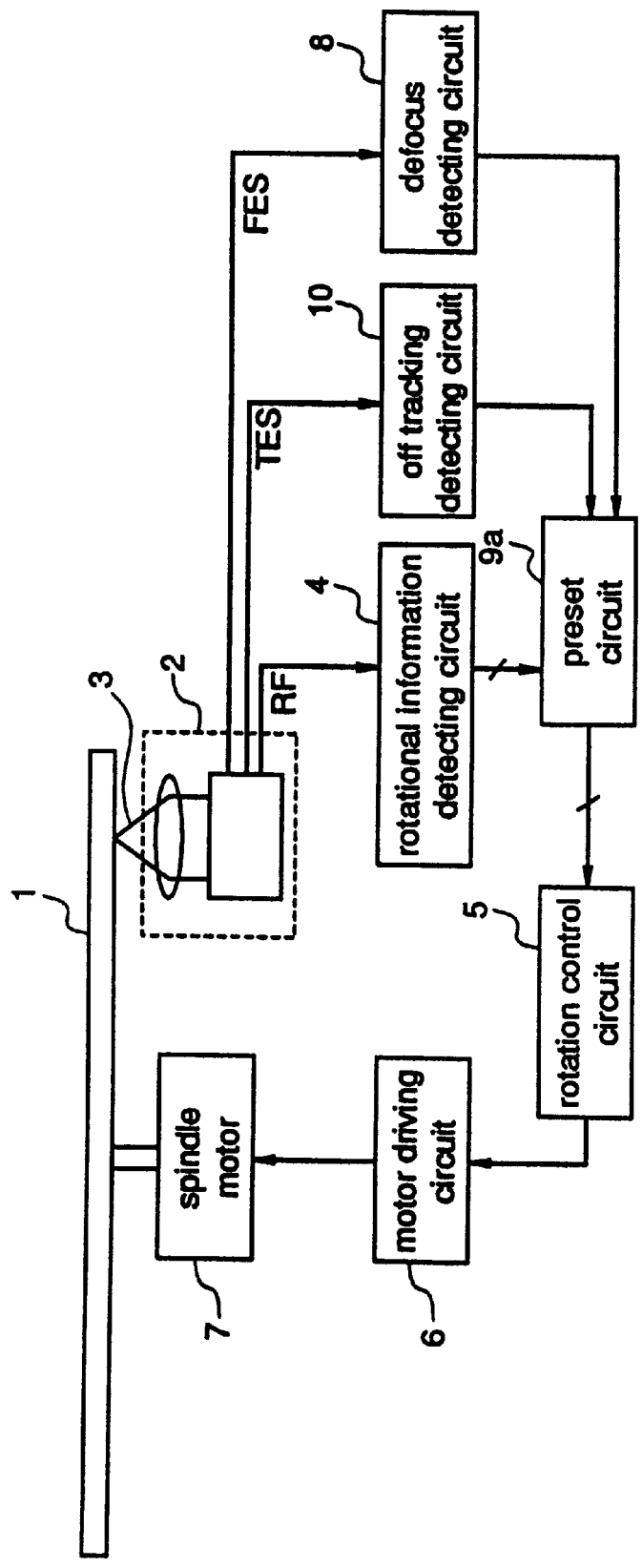
FIG. 16 is a block diagram illustrating a disk rotation control apparatus in accordance with a ninth embodiment of the invention.

FIG. 16 is a block diagram illustrating a disk rotation control apparatus in accordance with a ninth embodiment of the present invention. The apparatus according to this ninth embodiment is different from the apparatus according to the eighth embodiment only in that an off tracking detecting circuit 10 is added.

Figure 17:
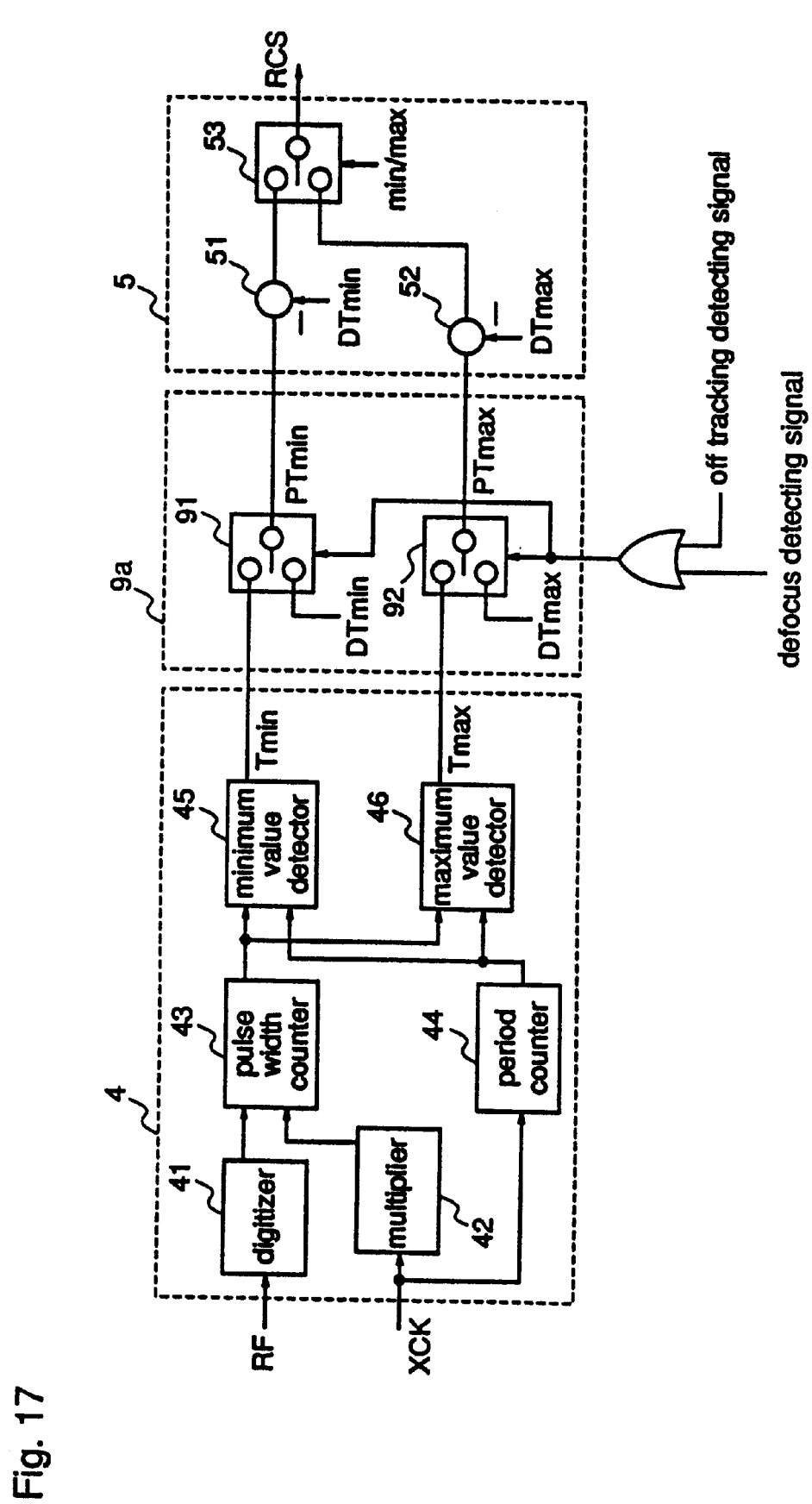
FIG. 17 is a block diagram illustrating, in detail, a rotational information detecting circuit, a preset circuit, and a rotation control circuit which are constituents of the disk rotation control apparatus shown in FIG. 16.

FIG. 17 is a block diagram illustrating the rotational information detecting circuit 4, the preset circuit 9a, and the rotation control circuit 6 in more detail.

In FIGS. 16 and 17, the off tracking detecting circuit 10 detects that off tracking occurs when a tracking error signal TES from the optical pick-up 2 is out of and larger than a prescribed range, and outputs a TTL level signal that is "High" when off tracking occurs and "Low" when the signal TES is within the prescribed range.

The rotational information signal from the rotational information detecting circuit 4 and the defocus detecting signal from the defocus detecting circuit 8 or the off tracking detecting signal from the off tracking detecting circuit 10 are input to the preset circuit 9a. The preset circuit 9a outputs the rotational information signal as it is when off tracking is not detected. Or, the preset circuit 9a outputs the rotational information signal as it is when defocus is not detected. When off tracking or defocus is detected, the preset circuit 9a outputs a $T_{min}$ control target value and a $T_{max}$ control target value.

The operation of the disk rotation control apparatus so constructed will be described using FIGS. 16 and 17.

Initially, the disk rotation control circuit 5 applies a disk rotation control signal through the driving circuit 6 to the spindle motor 7. The spindle motor 7 rotates at a prescribed rotational speed in response to the rotation control signal. In this state, the light beam 3 emitted from the optical pick-up 2 irradiates the optical disk 1. A focus servo system (not shown) controls the optical pick-up 2 so that the light beam 3 emitted from the pick-up 2 is accurately focused on the information recording surface of the optical disk 1. While the focus servo control is performed, a tracking servo system (not shown) controls the optical pick-up 2 so that the light beam 3 follows a track on the optical disk 1. In this way, the information recorded on the optical disk 1 is read from the reproduced RF signal.

Then, the rotational information detecting circuit 4 digitizes the reproduced RF signal in an appropriate slice level to produce an RF pulse signal. Then, the rotational information detecting circuit 4 counts a pulse width (edge-to-edge interval) of the RF pulse signal at a clock having a frequency twice as high as that of the reproduction reference clock XCK to obtain a counted value $T_{min}$ of the minimum time length of the reproduced signal and a counted value $T_{max}$ of the maximum time length of the reproduced signal, in every given period. The rotational information detecting circuit 4 outputs these values as a rotational information signal.

The off tracking detecting circuit 10 outputs an off tracking detecting signal in response to the tracking error signal TES from the optical head. The rotational information signal from the rotational information detecting circuit 4 is input to the preset circuit 9a. According to the off tracking detecting signal, the preset circuit 9a outputs the rotational information signal as it is when off tracking is not detected, and outputs the rotation control target value when off tracking is detected. Or, according to the defocus detecting signal, the preset circuit 9a outputs the rotational information signal as it is when defocus is not detected, and outputs the rotation control target value when defocus is detected. An output from the preset circuit 9a is input to the rotation control circuit 5.

Since the target value of $T_{min}$ is 11 as described above, when servo control on the basis of $T_{min}$ is performed, the target value of $T_{min}$, 11, is subtracted from the rotation information signal, and the rotation of the disk is controlled so that the difference between them is always zero. On the other hand, since the target value of $T_{max}$ is 31, when servo control on the basis of $T_{max}$ is performed, the target value of $T_{max}$, 31, is subtracted from the rotational information signal, and the rotation of the disk is controlled so that the difference between them is always zero. More specifically, the rotation control circuit 5 subtracts the $T_{min}$ control target value from the $PT_{min}$ signal output from the preset circuit 9a, and inputs the result of the subtraction to one of the two input terminals of the signal selector 53. Further, the rotation control circuit 5 subtracts the $T_{max}$ control target value from the $PT_{max}$ signal, and inputs the result of the subtraction to the other input terminal of the signal selector 53. Therefore, the signal selector 53 outputs a rotation control signal RCS from which the rotation control target value is subtracted.

The rotation control signal RCS is input to the driving circuit 6. The driving circuit 6 rotates the spindle motor 7 on the basis of the rotation control signal.

When off tracking is detected, the rotational information signal is made equal to the rotation control target value on the basis of the off tracking detecting signal. Hereinafter, this operation will be described in more detail. When focus control and tracking control are performed, the reproduced signal has a waveform of a constant amplitude. However, when the tracking servo is moved due to disturbance applied to the apparatus or when the tracking control is not performed, the quality of the reproduced signal is degraded.

When the quality of the reproduced signal is degraded, false detection of the rotational information signal increases. In order to solve this problem, the rotational information signal is made equal to the rotation control target value, according to the off tracking detecting signal. Thereby, the rotation control residual is made zero, and the rotation control circuit does not increase and decrease the rotational speed when off tracking is detected. Therefore, when the rotation of the disk is controlled by $T_{min}$, since the false detection of a $T_{min}$ value shorter than the correct $T_{min}$ value is avoided, the rotation control circuit does not recognize that the rotational speed of the disk should be decreased because it is higher than the target speed, so that unwanted stop of the disk is avoided. On the other hand, when the rotation of the disk is controlled by $T_{max}$, since the false detection of a $T_{max}$ value longer than the correct $T_{max}$ value is avoided, the rotation control circuit does not recognize that the rotational speed of the disk should be increased because it is lower than the target speed, so that unwanted runaway operation of the disk rotation control system is avoided.

Since the process of making the rotational information signal equal to the rotation control target value according to the defocus detecting signal when defocus is detected is already described for the eighth embodiment of the invention, repeated description is not necessary.

[Embodiment 10]

Figure 18:
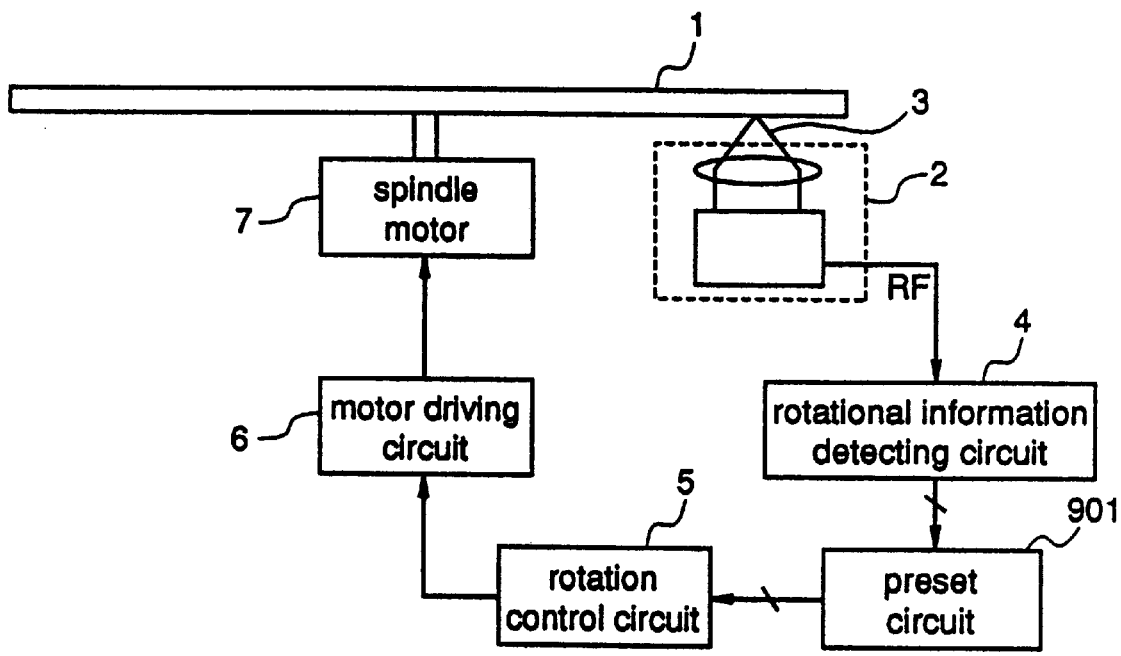
FIG. 18 is a block diagram illustrating a disk rotation control apparatus in accordance with a tenth embodiment of the invention.

FIG. 18 is a block diagram illustrating a disk rotation control apparatus in accordance with a tenth embodiment of the present invention. The apparatus according to this tenth embodiment is different from the apparatus according to the eighth embodiment in that it does not include a defocus detecting circuit, and a preset circuit 901 functions in a different manner from the preset circuit 9 according to the eighth embodiment.

Figure 19:
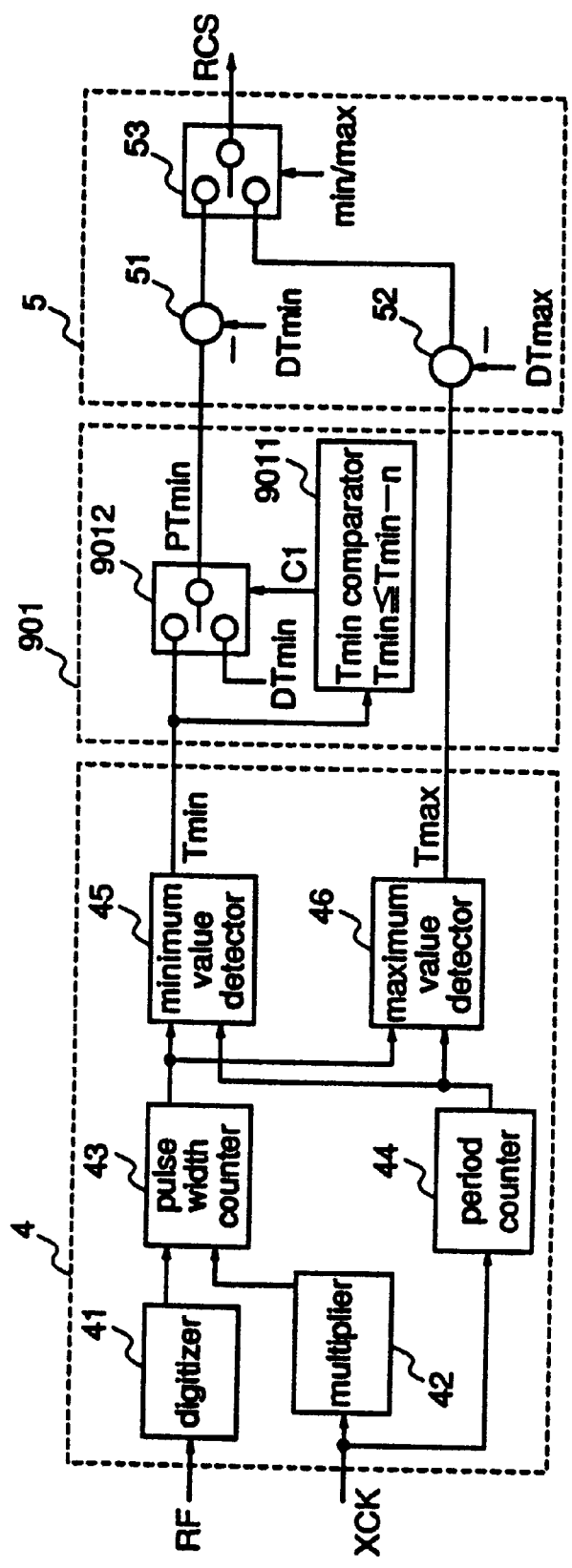
FIG. 19 is a block diagram illustrating, in detail, a rotational information detecting circuit, a preset circuit, and a rotation control circuit which are constituents of the disk rotation control apparatus shown in FIG. 18.

FIG. 19 is a block diagram illustrating the rotational information detecting circuit 4, the preset circuit 901, and the rotation control circuit 5 in more detail.

Hereinafter, the operation of the preset circuit 901 will be described using FIG. 19. The preset circuit 901 according to this tenth embodiment is different from the preset circuit 9 according to the eighth embodiment in that the preset circuit 901 performs presetting when $T_{min}$ is smaller than a prescribed value, whereas the preset circuit 9 performs presetting according to the defocus signal.

The preset circuit 901 comprises a comparator 9011 and a signal selector 9012. The comparator 9011 receives the minimum time length detected value $T_{min}$ from the rotational information detecting circuit 4 and outputs a preset TTL level signal that is "High" when $T_{min}$ is smaller than a prescribed value obtained by subtracting a constant n from a $T_{min}$ control target value $DT_{min}$, and "Low" when $T_{min}$ is not smaller than that value. Preferably, the constant n is 3 when the $T_{min}$ control target value $DT_{min}$ is 11. The minimum time length detected value $T_{min}$ from the rotational information detecting circuit 4 is input to one of two input terminals of the signal selector 9012, and the $T_{min}$ control target value $DT_{min}$ is input to the other input terminal of the signal selector 9012. The signal selector 9012 selects $DT_{min}$ when the preset signal from the comparator 9011 is "High" and selects $T_{min}$ when the preset signal is "Low", and outputs a $PT_{min}$ signal. The $PT_{min}$ signal is input to the rotation control circuit 5. The rotation control circuit 5 controls the rotation of the disk through the motor driving circuit 6, according to the $PT_{min}$ signal, when the control is based on $T_{min}$.

As described above, the minimum time length $T_{min}$ is preset to the $T_{min}$ control target value when the value $T_{min}$ from the rotational information detecting circuit 4 is smaller than the value obtained by subtracting the constant n from the $T_{min}$ control target value $DT_{min}$. Therefore, even when the quality of the reproduced signal is degraded due to defocusing, off tracking, or defect in the disk and an incorrect $T_{min}$ value is detected, sudden deceleration in the rotational speed of the disk is avoided and, even in the worst case, unwanted stop of the disk is avoided.

[Embodiment 11]

Figure 20:
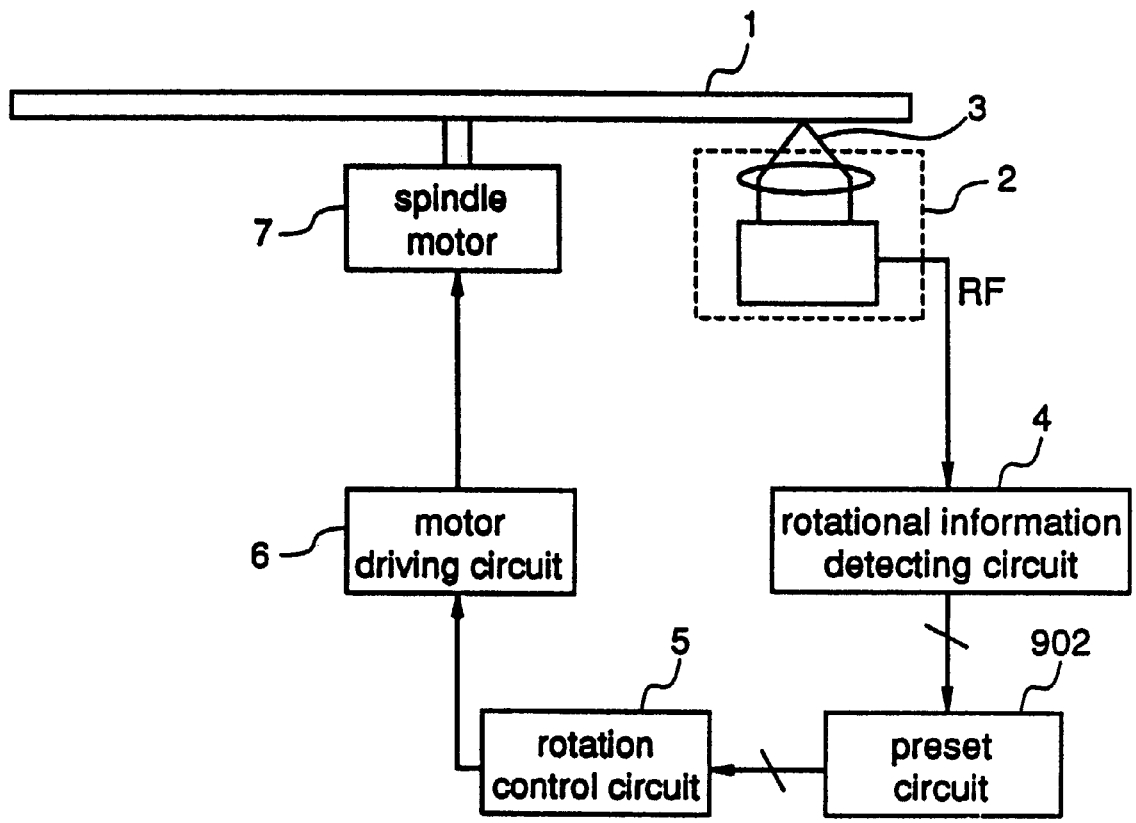
FIG. 20 is a block diagram illustrating a disk rotation control apparatus in accordance with an eleventh embodiment of the invention.

FIG. 20 is a block diagram illustrating a disk rotation control apparatus in accordance with an eleventh embodiment of the present invention. The apparatus according to this eleventh embodiment is different from the apparatus according to the eighth embodiment in that it is not provided with a defocus detecting circuit, and a preset circuit 902 functions in different manner from the preset circuit 9 according to the eighth embodiment.

Figure 21:
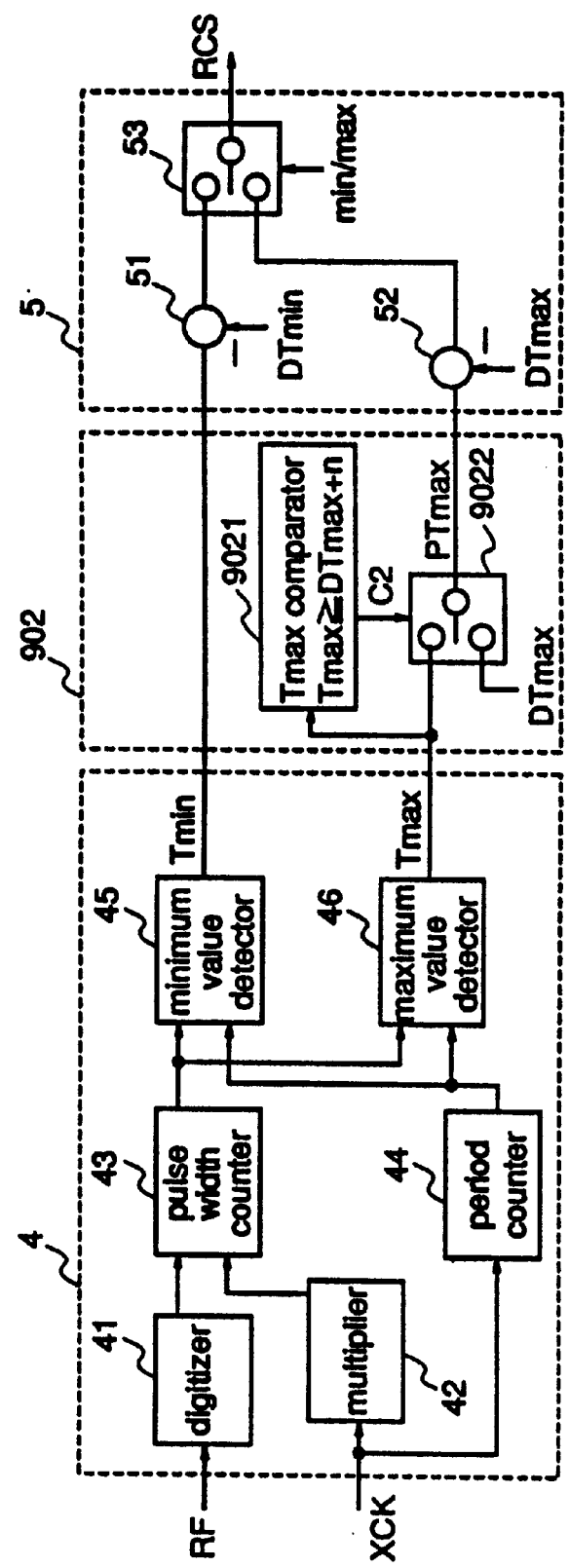
FIG. 21 is a block diagram illustrating, in detail, a rotational information detecting circuit, a preset circuit, and a rotation control circuit which are constituents of the disk rotation control apparatus shown in FIG. 20.
Figure 23:
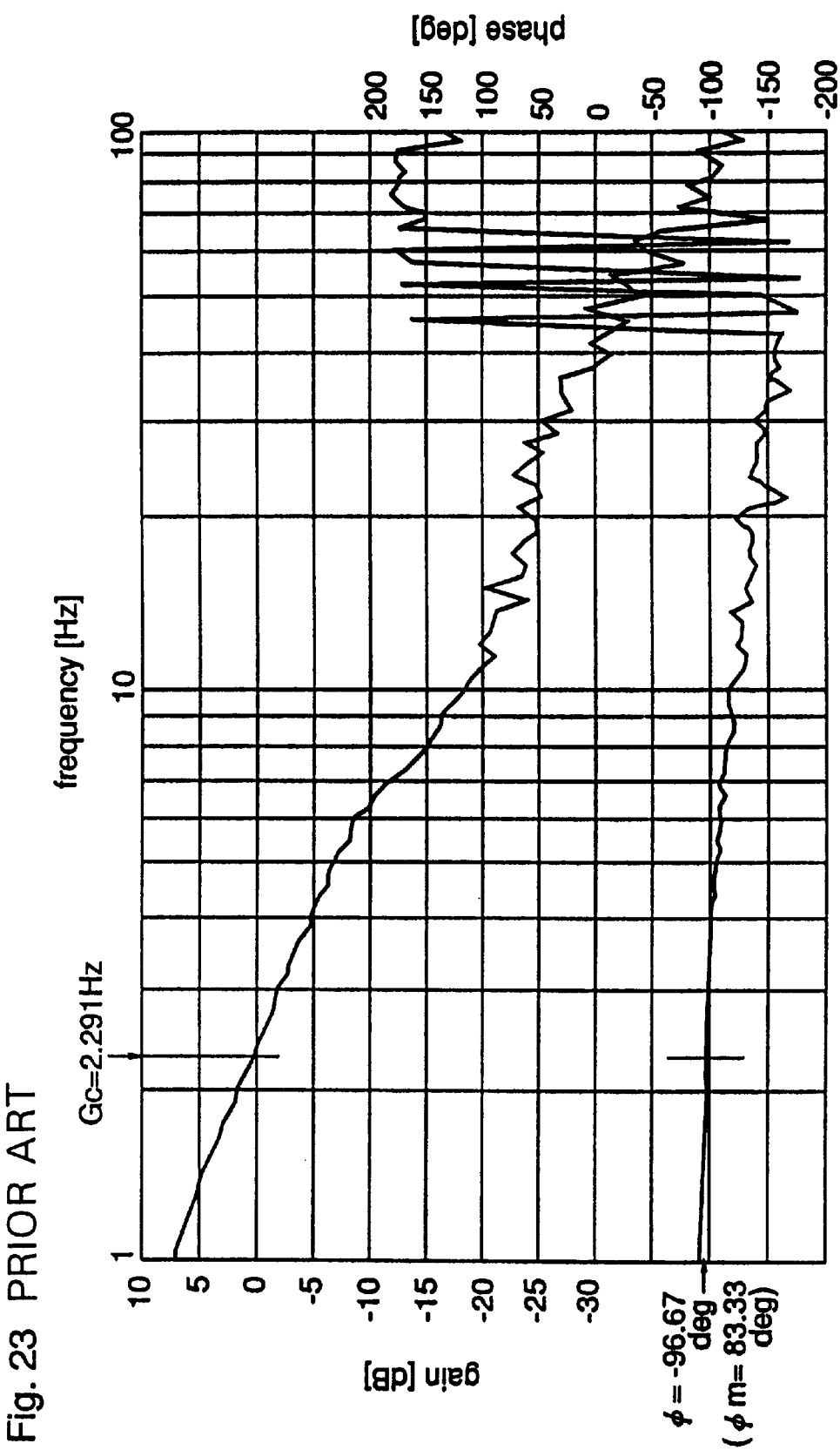
FIG. 23 is a graph showing $T_{min}$ control loop characteristics of a 12 cm disk.
Figure 24:
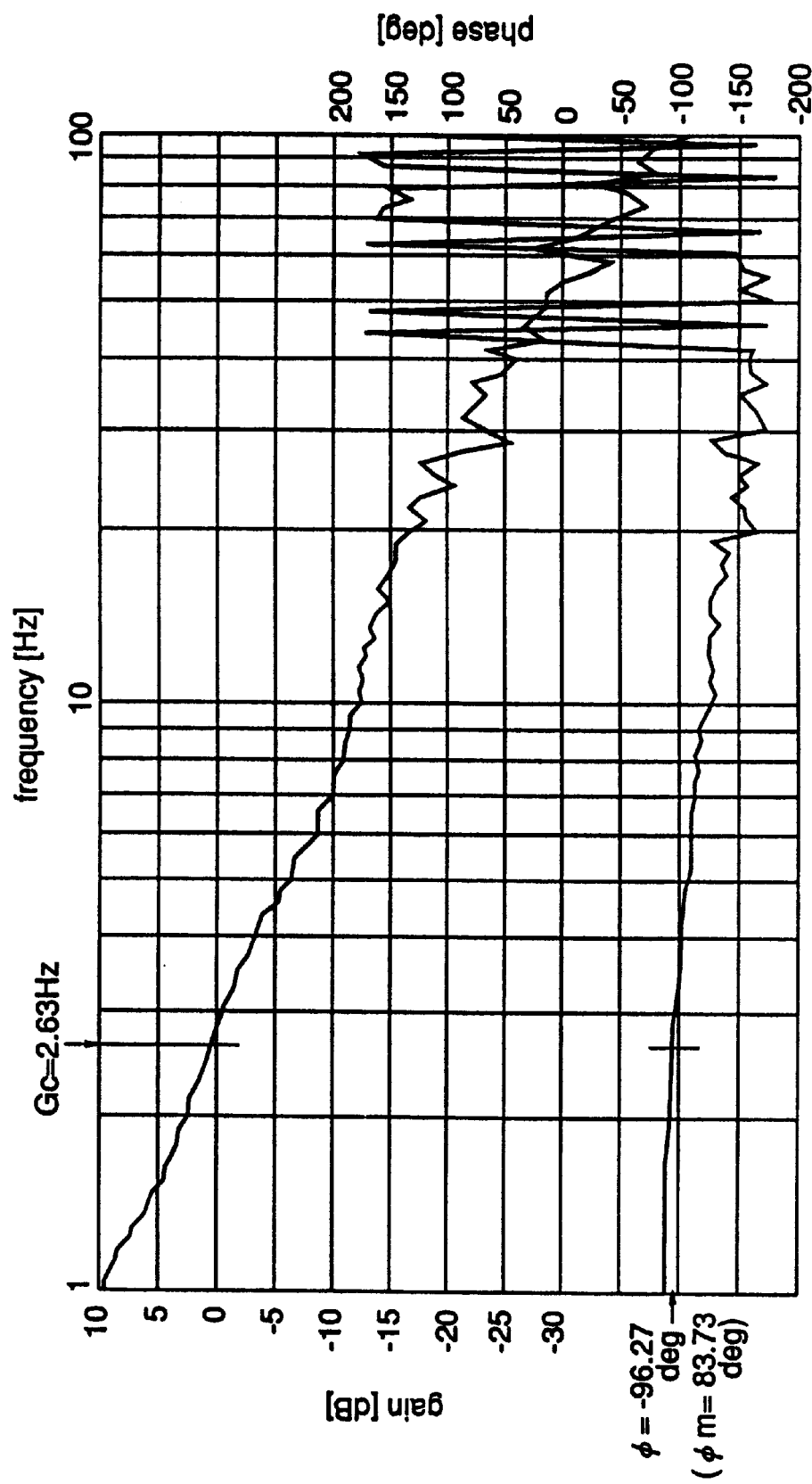
FIG. 24 is a graph showing $T_{min}$ control loop characteristics of an 8 cm disk.

FIG. 21 is a block diagram illustrating the rotational information detecting circuit 4, the preset circuit 902, and the rotation control circuit 5 in more detail.

Hereinafter, the operation of the preset circuit 902 will be described using FIG. 21. The preset circuit 902 according to this eleventh embodiment is different from the preset circuit 9 according to the eighth embodiment in that the preset circuit 902 performs presetting when $T_{max}$ is larger than a prescribed value, whereas the preset circuit 9 performs presetting in response to the defocus signal.

The preset circuit 902 comprises a comparator 9021 and a signal selector 9022. The comparator 9021 receives the maximum time length detected value $T_{max}$ from the rotational information detecting circuit 4 and outputs a preset TTL level signal that is "High" when $T_{max}$ is larger than a prescribed value obtained by adding a constant m to a $T_{max}$ control target value $DT_{max}$, and "Low" when $T_{max}$ is not larger than that value. Preferably, the constant m is 5 when the $T_{max}$ control target value $DT_{max}$ is 31. The maximum time length detected value $T_{max}$ from the rotational information detecting circuit 4 is input to one of two input terminals of the signal selector 9022, and the $T_{max}$ control target value $DT_{max}$ is input to the other input terminal of the signal selector 9022. The signal selector 9022 selects $DT_{max}$ when the preset signal from the comparator 9021 is "High" and selects $T_{max}$ when the preset signal is "Low", and outputs a $PT_{max}$ signal. The $PT_{max}$ signal is input to the rotation control circuit 5. The rotation control circuit 5 controls the rotation of the disk through the motor driving circuit 6, according to the $PT_{max}$ signal, when the control is based on $T_{max}$.

As described above, the maximum time length value $T_{max}$ is preset to the $T_{max}$ control target value when the value $T_{max}$ from the rotational information detecting circuit 4 is larger than the value obtained by adding the constant m to the $T_{max}$ control target value $DT_{max}$. Therefore, even when the quality of the reproduced signal is degraded due to defocusing, off tracking, or defect in the disk and the $T_{max}$ value is incorrectly detected, sudden deceleration in the rotational speed of the disk is avoided and, even in the worst case, undesired runaway control of the rotation control system is avoided.

In the eighth, ninth, tenth, and eleventh embodiments of the invention, as a countermeasure against the false detection of the rotational information signal that occurs due to defocusing or off tracking or when $T_{min}$ is smaller than a prescribed value or $T_{max}$ is larger than a prescribed value, to hold the rotational information signal is considered. According to the timing of the detection of the rotational information signal and the processing for the false detection, the falsely detected rotational information signal may be held. However, when the rotational information signal is made equal to the rotation control target value, even through the rotational information signal is falsely detected, the control is not continuously performed on the basis of the false data during the holding period, malfunction of the rotation control circuit is avoided with high reliability.

Further, although the rotational information signal is made equal to the rotation control target value when the rotational information signal is falsely detected, other methods may be employed as long as the disk rotation control residual becomes zero when the false detection of the rotational information signal occurs.

Furthermore, the constant n in the tenth embodiment and the constant m in the eleventh embodiment are not restricted to those values mentioned above. These constants may be appropriately set according to the modulation rule of the information reproduced signal. Alternatively, these constants may be set according to the circuit structure of the apparatus, the loop gain of the disk rotation control system, or the dynamic range of the circuit.

Furthermore, according to the tenth and eleventh embodiments of the invention, data of $T_{min}$ lower than a prescribed value are deleted from $T_{min}$ of the rotational information signal, and data of $T_{max}$ larger than a prescribed value are deleted from $T_{max}$ of the rotational information signal and, at this time, an output signal from the rotation control circuit is substantially zero. Therefore, when the apparatus is constituted so that the operation described for the tenth or eleventh embodiment is performed under the CLV control, the apparatus is applicable as a countermeasure against abnormal CLV control.

What is claimed is:

1. A disk rotation control apparatus comprising:

a spindle motor for rotating a disk;

an optical pick-up for reproducing information recorded on the disk;

a tracking control means for controlling, the optical pick-up so that a light beam emitted from the optical pick-up and focused on the disk is positioned on a track on the disk, according to a tracking error signal output from the optical pick-up;

a maximum time length detecting means for successively measuring maximum time lengths of a reproduction signal output from the optical pick-up, deciding a maximum time length of the reproduction signal on the basis of measured N values of the maximum time lengths, and outputting the decided maximum time lengths;

a minimum value of the maximum time lengths detecting means for detecting a minimum value among the measured N values of the maximum time lengths output from the maximum time length detecting means, and outputting the decided minimum value of the maximum time length; and a rotation control means for controlling on the basis of a difference between the decided minimum time length output from the minimum value of the maximum time length detecting means and a prescribed target time length, a rotational speed of the spindle motor, wherein the minimum value of the maximum time lengths detecting means outputs a minimum value among the measured N values as the maximum time length of the reproduction signal whether or not the tracking control means operates.

2. The disk rotation control apparatus of claim 1 wherein, when a difference between a maximum time length $T_{max}1$ output from the time length detecting means and a maximum time length $T_{max}0$ output from the time length detecting means in advance of $T_{max}1$ exceeds a prescribed value, the rotation control means applies to the spindle motor a signal corresponding to the difference between the maximum time length $T_{max}0$ and the target time length.

* * * * *

UNITED STATES PATENT AND TRADEMARK OFFICE
CERTIFICATE OF CORRECTION

PATENT NO.   : 6,195,321 B1  
DATED        : February 27, 2001  
INVENTOR(S)  : Kouichi Takamine et al.

It is certified that error appears in the above-identified patent and that said Letters Patent is hereby corrected as shown below:

<u>Title page,</u>
Item [57], ABSTRACT,
Line 13, change "decides" to -- deciding --.

<u>Column 33,</u>
Line 16, after "controlling" delete ",".

Signed and Sealed this

Twenty-third Day of September, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,195,321 B1
DATED : February 27, 2001
INVENTOR(S) : Kouichi Takamine et al.

It is certified that error appears in the above-identified patent and that said Letters Patent is hereby corrected as shown below:

<u>Title page,</u>
Item [57], ABSTRACT,
Line 12, delete "for".

Signed and Sealed this

Second Day of December, 2003

JAMES E. ROGAN
*Director of the United States Patent and Trademark Office*